US006789948B2

(12) United States Patent
Nakajima

(10) Patent No.: US 6,789,948 B2
(45) Date of Patent: Sep. 14, 2004

(54) MAGNETIC ENCODER AND WHEEL BEARING ASSEMBLY USING THE SAME

(75) Inventor: Tatsuo Nakajima, Iwata (JP)

(73) Assignee: NTN Corporation, Osaka (JP)

( * ) Notice: Subject to any disclaimer, the term of this patent is extended or adjusted under 35 U.S.C. 154(b) by 185 days.

(21) Appl. No.: 10/251,800

(22) Filed: Sep. 23, 2002

(65) Prior Publication Data
US 2003/0059139 A1 Mar. 27, 2003

(30) Foreign Application Priority Data

Sep. 25, 2001 (JP) ......................................... 2001-290300
Jul. 2, 2002 (JP) ......................................... 2002-192908

(51) Int. Cl.[7] ............................................... F16C 19/08
(52) U.S. Cl. ..................................... 384/448; 324/174
(58) Field of Search ................................. 384/448, 446, 384/544; 324/174, 173

(56) References Cited

U.S. PATENT DOCUMENTS

| 5,431,413 A | 7/1995 | Hajzler |
| 5,575,568 A | 11/1996 | Rigaux et al. |
| 6,692,153 B2 * | 2/2004 | Ohtsuki et al. ............. 384/448 |
| 6,692,582 B1 * | 2/2004 | Kojima et al. .............. 148/101 |

FOREIGN PATENT DOCUMENTS

| EP | 0 481 224 A1 | 4/1992 |
| EP | 0 785 369 A1 | 7/1997 |
| EP | 0 992 797 A1 | 4/2000 |
| JP | 63-115008 | 5/1988 |
| JP | 63-300910 | 12/1988 |
| JP | 04-073907 | 3/1992 |
| JP | 6-281018 | 10/1994 |
| JP | 09-033551 | 2/1997 |
| JP | 2816783 | 8/1998 |

* cited by examiner

Primary Examiner—Lenard A. Footland

(57) ABSTRACT

To provide a magnetic encoder that has an increased detecting sensitivity, can be thin-walled, have an increased reliability and an increased durability, can easily be handled during manufacture and assembly and is excellent in productivity, the magnetic encoder (10) includes a multi-pole magnet element (14) having opposite magnetic poles alternating with each other in a circumferential direction, and a core metal (11) for supporting the multi-pole magnet element (14). The multi-pole magnet element (14) is made of a sintered element prepared by sintering a powdery mixture of a powdery magnetic material and a powdery non-magnetic metallic material.

23 Claims, 11 Drawing Sheets

MAGNETIC ENCODER AND WHEEL BEARING ASSEMBLY USING THE SAME

BACKGROUND OF THE INVENTION

1. Field of the Invention

The present invention generally relates to a magnetic encoder used in, for example, a rotation detecting device for detecting the rotational speed of bearing elements rotatable relative to each other and a wheel bearing assembly utilizing such magnetic encoder. In particular, the present invention relates to the magnetic encoder that forms one of component parts of a bearing sealing device that can be mounted in the rotation detecting device employed in an anti-skid control system for a motor vehicle for detecting the rotational speed of front and rear vehicle wheels.

2. Description of the Prior Art

The rotation detecting device for use in association with an anti-skid control system generally used in, for example, motor vehicles has hitherto been available in various types. Of them, the rotation detecting device has been known which includes a toothed rotor and a rotation detecting sensor that are separated from each other by means of a sealing device used to seal a bearing assembly. This known rotation detecting device is separate from and independent of the sealing device used in the bearing assembly.

This known rotation detecting device is of a structure wherein the rotational speed (the number of revolutions) of the toothed rotor mounted on a rotatable shaft is detected by the rotation detecting sensor mounted on a knuckle, and the bearing assembly used is protected from any possible ingress of water and/or any other foreign matter by means of the sealing device independently provided laterally of the rotation detecting device.

A different type is disclosed in, for example, the Japanese Patent No. 2816783, in which for reducing the space for mounting of the rotation detecting device to thereby drastically increase the sensing performance of the rotation detecting device, the rotation detecting device for detecting the rotational speed of a wheel is incorporated in a bearing seal unit. This bearing seal unit is of a structure in which an elastic member mixed with a powdery magnetic material is bonded radially by vulcanization to a slinger used therein so as to extend circumferentially, which elastic member has a plurality of opposite magnetic poles alternating with each other in a direction circumferentially thereof.

The Japanese Laid-open Patent Publication No. 6-281018 (U.S. Pat. No. 5,431,413) discloses the structure in which for reducing the dimension in an axial direction to increase the sealability between a rotatable member and a stationary member and also to facilitate mounting, a space between the rotatable member and the stationary member is sealed with a rotary disc mounted on the rotatable member while the rotary disc is provided with a coder magnetized to a plurality of opposite magnetic poles, to thereby complete a coder incorporated sealing structure. The coder used therein is made of an elastomer added with magnetic particles and has its side surface rendered to be a sealing means that is in flush with a side surface of the stationary member.

The coder made of a plastic material (plastomer) containing a powdery magnetic material or magnetic particles is shaped using a mold assembly adapted to the shape of a final product, that is, molded to the shape defined by the molding cavity within the mold assembly such as performed with the conventional injection molding or the compressive molding, or molded to the shape of a final product by means of an extrusion molding technique using a T-shaped die, or is first prepared by a sheet molding technique such as a calendaring technique in the form of a sheet that is then shaped by means of a blanking technique to the shape of a final product, which final product may be subsequently fixedly bonded to a metallic substrate with the use of a bonding agent. In such case, while a metallic substrate is incorporated in the mold assembly such as an insert molding, molten resin may be subsequently poured into the mold assembly so that a bonding step can be performed simultaneously.

However, of the various prior arts discussed above, the bearing seal device disclosed in any one of the Japanese Patent No. 2816783 and the Japanese Laid-open Patent Publication No. 6-281018 (U.S. Pat. No. 5,431,413) requires the use of an elastomer or an elastic material component that serves as a binder for retaining the powdery magnetic material or the magnetic particles. This is particularly true where the elastic material mixed with the powdery material is bonded radially by vulcanization to the slinger so as to extend circumferentially thereof or the coder defining the coder equipped sealing structure equipped with the coder magnetized to the opposite magnetic poles is rendered to be an elastomer added with the magnetic particles. However, where the elastomer or the elastic material component is used as a binder, it is always necessary to use a dispersing step in which prior to the shaping to the shape of the coder the powdery magnetic material or the magnetic particles are kneaded with the elastomer or the elastic material. Since during this step the relative content by percent (the percent by volume) of the powdery magnetic material or the magnetic particles relative to the binder component is difficult to increase, the coder must have a large thickness in order to secure the magnetic force sufficient to allow the magnetic sensor to perform sensing.

The molding of the coder made of the elastic material or the elastomer containing the powdery magnetic material or the magnetic particles, is performed by shaping with the use of a mold assembly appropriate to the shape of a product by means of, for example, an injection molding technique or a compressive molding technique and, in the case where a vulcanizing step is needed, the elastic material or the elastomer should be retained within the molding assembly for a vulcanizing time needed, thereby posing a problem in that a relatively large number of processing steps are needed.

Also, the coder made of the elastic material or the elastomer containing the powdery magnetic material or the magnetic particles, requires the detecting sensor to be positioned at a location in the vicinity of and relative to the slinger used therein in a direction axially of such slinger so that, for example, in the bearing seal device utilizing the rotation detecting device for detecting the rotational speed of the wheel, the space for mounting thereof can be reduced and the detecting performance can be drastically increased. In such case, when particulate matter such as sand particles are trapped in and bitten within a gap delimited between the bearing seal surface on a rotating side and a detecting sensor surface on a stationary side during run of a motor vehicle, it is often observed that the surface of the coder made of the elastic material or the elastomer will be damaged considerably due to, for example, frictional wear.

In the case of the coder made of the plastic material (plastomer) containing the powdery magnetic material or the magnetic particles, when an attempt is made to mold the coder by the use of the conventional injection molding technique, the compressive molding technique, the extrusion molding technique using the T-shaped die, the sheet molding technique such as the calendaring technique, or the insert molding technique as hereinbefore discussed, the use of a synthetic resin component that serves as a binder for retaining the powdery magnetic material or the magnetic particles is needed after all. However, even where the synthetic resin component is used as the binder, as is the case with the elastomer, the dispersing step has hitherto been required in which prior to the shaping to the shape of the coder, the powdery magnetic material or the magnetic particles are kneaded together with the plastomer or the elastic material. After all since, during this dispersing step, it is difficult to increase the relative percent content (the percent by volume) of the powdery magnetic material or the magnetic particles relative to the binder component, the thicknesswise dimension of the coder has to be increased in order to secure the magnetic force sufficient to allow the magnetic sensor to perform a stable sensing operation.

Also, when a preform material prepared by kneading a mixture of the powdery magnetic material or the magnetic particles and the plastomer or the elastic material according to the conventional manufacturing method is injected into or compressed within the mold assembly to form the coder, or is shaped by means of the insert molding technique to form the coder, since the magnetic particulate component contained in the preform material is an oxide of metal and is therefore so hard as to bring about a problem associated with frictional wear of molds of the mold assembly and/or the molding machine in term of mass productivity and since the preform material containing a high content of the magnetic particulate component tends to exhibit a high melt viscosity, there has been a problem in that the molding pressure or the mold clamping force has to be increased, resulting in increased load on the molding.

Even in the case of the extrude molding using the T-shaped die and the sheet molding such as the calendaring technique, since the magnetic particulate component contained in the preform material is an oxide of metal and is therefore hard, there has been a problem associated with frictional wear of the T-shaped die and rolls of the calendaring machine in terms of mass productivity.

SUMMARY OF THE INVENTION

In view of the foregoing, the present invention is intended to provide a magnetic encoder capable of being reduced in thickness, being excellent in resistance to frictional wear and, also, in productivity.

Another important object of the present invention is to provide a wheel bearing assembly, which is effective to achieve the rotation detection with a simplified structure with no need to increase the number of component parts used and, also, to employ the magnetic encoder for detection of the rotation that has an increased durability.

In order to accomplish these objects of the present invention, there is, in accordance with one aspect of the present invention, provided a magnetic encoder which includes a multi-pole magnet element having a plurality of opposite magnetic poles alternating with each other in a circumferential direction; and a core metal for supporting the multi-pole magnet element. The magnetic encoder of this structure is featured in that the multi-pole magnet element is a sintered element prepared by sintering a powdery mixture of a powdery magnetic material and a powdery non-magnetic metallic material. The multi-pole magnet element may be of, for example, of an annular shape such as a ring shape or of a disc shape. Similarly, the core metal is also of an annular shape such as a ring shape or of a disc shape.

According to this aspect of the present invention, since the multi-pole magnet element is a sintered element in which a powdery mixture of the powdery magnetic material and the powdery non-magnetic metallic material is sintered, the following advantages can be obtained.

a) As compared with the conventional elastomer and plastomer, it is possible to increase the ratio of the powdery magnetic material used and, for this reason, a magnetic force per unit volume can be increased. Thus, the detecting sensitivity can be increased and, also, the thicknesswise dimension can be reduced.

b) As compared with the conventional sintered magnet in which only the powdery magnetic material is sintered, cracking does hardly occur due to the presence of the powdery non-magnetic metallic material serving as a binder.

c) Since the surface is hard as compared with the conventional elastomer or the like, the resistance to frictional wear is excellent and damages are hard to occur.

d) As compared with the conventional elastomer or the like, the productivity is excellent.

In the magnetic encoder according to the present invention, the powdery magnetic material may be a ferrite powder. The ferrite powder is inexpensive as compared with the other powdery magnetic material and, accordingly, the use of it make it possible to manufacture the magnetic encoder inexpensively. The ferrite powder may be a mass of particulates or a pulverized powder of a wet-type anisotropic ferrite core. Where the pulverized powder of the wet-type anisotropic ferrite core is used, it is necessary to prepare a green compact formed from a powdery mixture with the powdery non-magnetic metallic material in a magnetic field. The green compact stands for an unsintered green material.

Also, he powdery magnetic material may be a magnetic powder of a rare earth type. By way of example, it may be a magnetic powder of a samarium type or a magnetic powder of a neodymium type. Where the magnetic powder of a samarium type or the magnetic powder of a neodymium type is employed, a high magnetic force can be obtained. The magnetic powder of the samarium type referred to above may be a magnetic powder of a samarium iron (SmFeN) type and the magnetic powder of the neodymium type referred to above may be a magnetic powder of a neodymium iron (NdFeB) type. The powdery magnetic material may also be suitably employed in the form of a gas atomized powder of manganese aluminum (MnAl).

The powdery non-magnetic material that can be employed in the practice of the present invention may be a powder of stainless steel or a powder of tin. Where the powdery magnetic material is employed in the form of a ferrite powder, either the stainless steel powder or the tin powder can be used for the powdery non-magnetic metallic material. On the other hand, where the powdery magnetic material is employed in the form of the magnetic powder of the samarium type, either the stainless steel powder or the tin powder can be also used for the powdery non-magnetic metallic material. Again, where the powdery magnetic material is employed in the form of the magnetic powder of the neodymium type, either the stainless steel powder or the tin powder can be similarly used for the powdery non-magnetic metallic material. As compared with the other non-magnetic metallic powder, the stainless steel powder is excellent in rust prevention and, therefore, the sintered element utilizing the stainless steel powder can exhibit a high rust preventive property.

The powdery mixture referred to above may contain two or more powdery magnetic materials or two or more powdery non-magnetic metallic materials. Also, the powdery mixture referred to above may contain two or more powdery magnetic materials in combination with two or more powdery non-magnetic metallic materials. Where the powdery mixture referred to above contains two or more powdery magnetic materials or two or more powdery non-magnetic metallic materials, a desired property can be obtained by mixing a plurality of arbitrarily chosen powders. By way of example, where the sole use of the ferrite powder appears to result in an insufficient magnetic force, the ferrite powder may be mixed with a required amount of the magnetic powder of the samarium type or the magnetic powder of the neodymium type that is a rare earth magnetic material so that, while being manufactured inexpensively, the magnetic force can be increased.

The magnetic powder containing two or more materials may be a mixture of two or more of the magnetic powder of the samarium iron (SmFeN) type, the magnetic powder of the neodymium iron (NdFeB) type, and the gas atomized powder of manganese aluminum (MnAl). By way of example, the powdery magnetic material referred to above may be any of a mixture of the magnetic powder of the samarium iron (SmFeN) type and the magnetic powder of the neodymium iron (NdFeB), a mixture of the magnetic powder of the neodymium iron type and the gas atomized powder of manganese aluminum, a mixture of the gas atomized powder of manganese aluminum and the magnetic powder of the samarium iron type, or a mixture of the magnetic powder of the samarium iron type, the magnetic powder of the neodymium iron type and the gas atomized powder of manganese aluminum. Also, the powdery magnetic material referred to above may be a mixture of the ferrite powder mixed with a required amount of any one of the magnetic powder of the samarium iron (SmFeN) type and the magnetic powder of the neodymium iron (NdFeB) type.

Preferably, the powdery magnetic material and the powdery non-magnetic metallic material both used in the powdery mixture have an average particle size not smaller than 10 μm and not greater than 150 μm. If one or the both of the powdery magnetic material and the powdery non-magnetic metallic material has or have an average particle size smaller than 10 μm, the powdery mixture will hardly flow into the mold assembly when the green compact is to be prepared, and no green compact of a predetermined shape cannot be obtained. On the other hand, if one or the both of the powdery magnetic material and the powdery non-magnetic metallic material has or have an average particle size greater than 150 μm, the green compact will not have a sufficient strength.

Also preferably, with respect to a composition of the powdery mixture, the volume based content of the powdery non-magnetic metallic material is not smaller than 1 vol. % and not greater than 90 vol. %. If the volume based content of the powdery non-magnetic metallic material is smaller than 1 vol. %, the amount of the powdery non-magnetic metallic material acting as a metal binder will be so insufficient that the resultant multi-pole magnet element obtained after sintering will become rigid, but fragile. It may occur that no green compact can be molded. On the other hand, if the volume based content of the powdery non-magnetic metallic material is greater than 90 vol. %, the amount of the powdery magnetic material will be relatively small and it will therefore be difficult to secure the magnetic force necessary to achieve a stabilized sensing.

Again preferably, the multi-pole magnet element made of the sintered element has a coefficient of linear expansion not lower than $0.5 \times 10^{-5}$ and not higher than $9.0 \times 10^{-5}$. If the multi-pole magnet element has a coefficient of linear expansion lower than $0.5 \times 10^{-5}$ or higher than $9.0 \times 10^{-5}$, the difference between it and a coefficient of linear expansion of a metallic material for the core metal is so large that the difference in amount of change in dimension when used under an environment of high or low temperature will become large. For this reason, there is a possibility that the multi-pole magnet element may be damaged, making it difficult to secure fixing between the multi-pole magnet element and the core metal.

The green compact of the powdery mixture before being sintered may have a porosity of not lower than 5 vol. % and not higher than 30 vol. %. If the porosity is lower than 5 vol. %, there is a high possibility that the green compact (the green compact) being prepared may break by the effect of a spring back phenomenon that will be induced as a result of an elastic restoration from an elastically deformed state of powdery mixture when the compacting or molding pressure applied is progressively removed. On the other hand, if the porosity thereof is higher than 30 vol. %, the physical strength of the sintered element will be so low that it is difficult to mechanically fix the sintered element to the core metal by means of a clamping process or a press fitting process and, also, because of lack of a sufficient bondability among the particles, there is a possibility that the green compact cannot be molded.

The sintered element forming the multi-pole magnetic element may preferably have a plate thickness not smaller than 0.3 mm and not greater than 5 mm. Considering that the powdery magnetic material and the powdery non-magnetic metallic material both used in the practice of the present invention are expensive, the smaller the plate thickness, the better. However, if the plate thickness is smaller than 0.3 mm, the green compact is difficult to mold. On the other hand, if the plate thickness is too large, variation in density will easily occur in the green compact to such an extent as to result in the green compact after having been sintered that is susceptible to deformation. In view of these considerations, the plate thickness is preferably within the range of 0.3 to 5 mm.

In the magnetic encoder of the structure discussed above with or without one or some of the various preferred features incorporated therein in accordance with the present invention, a surface of the multi-pole magnet element made of the sintered element may be formed with a rust preventive coating made of a high anti-corrosion clear paint. Preferably, the rust preventive coating may have a film thickness not smaller than 0.5 μm and may also be formed by the use of a paint of a modified epoxy phenol hardening system as the high anti-corrosion clear paint.

Where the rust preventive coating is formed on the surface of the multi-pole magnet element, because of its rust preventive property, the magnetic encoder can be advantageously used in an environment where rusting tends to occur such as in a wheel bearing assembly. The paint referred to above can be expected to bring about an effect as a bonding agent for bonding the core metal and the sintered element together and, when penetrating into the pore in a surface region of the porous sintered element, the paint can be appropriately retained in the surface by an anchoring effect of the clear paint film component and, therefore, a favorable bondability as the rust preventive coating can be maintained even during the use for a prolonged period of time.

The powdery magnetic material and the powdery non-magnetic metallic material are mixed in a predetermined mixing ration by the use of a powder mixing machine to provide the powdery mixture which is subsequently compacted at normal temperatures within a mold assembly to thereby provide a green compact.

At this time, since the sintered element made of the powdery magnetic mixture containing the powdery magnetic material with the powdery non-magnetic metallic material used as a binder can provide a dry blend of the powders in which the powdery non-magnetic metallic material and the powdery magnetic material are dispersed in the powder mixing machine while the mixing ratio thereof is adjusted, the relative content (the volume based percent) of the powdery magnetic material in the sintered element can be increased. For this reason, the magnetic force effective to achieve the stabilized sensing can easily be obtained in the magnetic sensor and there is no need to increase the thickness of the multi-pole magnet element.

Moreover, even during the manufacture of the sintered element that subsequently forms the multi-pole magnet element, the sintering and molding method of the mixed powders based on the dry blend of the powders does not require any vulcanizing as compared with the injection molding or the compressive molding in the case of the conventional elastomer or the elastic material and involves a little load in molding and, therefore, the process of production can be extremely simplified. In addition, in the case of the molding of the green compact by means of the sintering process, as compared with the injection molding or the compressive molding of the elastomer or the elastic material, there is no problem associated with frictional wear of the mold assembly.

Yet, considering that the mounting of the sintered element forming the multi-pole magnet element onto the core metal can be achieved by the use of a mechanical fixing technique such as, for example, a simple crimping process or a interference fit, the reliability can be retained even when exposed to a severe conditions under a high and low temperature environment.

When the sintered element secured to the core metal as hereinbefore described is magnetized to have a plurality of opposite magnetic poles alternating with each other in a circumferential direction, the multi-pole magnet element results in.

The foregoing magnetic encoder, when positioned in face-to-face relation with the magnetic sensor, can be used for detecting rotation. When the magnetic encoder is rotated, passage of the opposite magnetic poles of the multi-pole magnet element can be detected by the magnetic sensor which detects the rotation in the form of a train of pulse, the number of which pulse corresponds to the number of revolutions and, hence, the rotational speed of the magnetic encoder. Since the multi-pole magnet element is made of the sintered element in which the powdery magnetic material has been mixed, it can be thin-walled while securing the magnetic force sufficient to obtain the stabilized sensing and, not only can the magnetic encoder be manufactured compact in size while having an excellent resistance to frictional wear, but also the multi-pole magnet element can be integrated together with the core metal, made of a metallic material, by the use of any known fixing method such as a crimping or press fitting, and thus it is excellent as a fixing method.

A wheel bearing assembly according to another aspect of the present invention makes use of the magnetic encoder with or without one or some of the various preferred features incorporated therein in accordance with the present invention. Accordingly, rotation detection can be achieved with a compact structure and the magnetic encoder for the rotation detection is robust.

As is well known to those skilled in the art, the wheel bearing assembly is very often exposed to a severe environment on a road surface where particles such as, for example, sand particles tend to be trapped in between the magnetic encoder and the magnetic sensor facing the magnetic encoder. Once this occurs, protection is available in the following manner.

Specifically, the surface hardness of the multi-pole magnet element made of the sintered element made up of the powdery magnetic material and the powdery non-magnetic metallic material is high as compared with the conventional coder made of the elastic material or the elastomer containing the powdery magnetic material and the magnetic particles. For this reason, in the wheel bearing assembly incorporating the magnetic encoder for the detection of the rotational speed of the wheel, even when the particles such as sand particles are trapped in and bitten within the gap between the surface of the multi-pole magnet element on the rotatable side and the surface of the magnetic sensor on the stationary side during run of the motor vehicle, there is a considerably high effect of reducing frictional damages to the multi-pole magnet element.

The wheel bearing assembly according to the present invention may employ the magnetic encoder as a part of a sealing unit for sealing a bearing space. By way of example, this wheel bearing assembly for rotatably supporting a wheel relative to a vehicle body may include an outer member having an inner peripheral surface formed with a plurality of rows of first raceways, an inner member having a corresponding number of second raceways defined therein in alignment with the first raceways in the outer member, and rows of rolling elements rollingly received in part within the first raceways and in part within the second raceways, wherein a sealing unit may be provided for sealing an annular space delimited between the outer member and the inner member. With this structure, the rotation of the wheel can be detected with no need to increase the number of component parts.

In such case, the sealing unit may include a first sealing plate mounted on one of the outer and inner members which serves as a rotatable member, and a second sealing plate of a generally L-sectioned configuration mounted on the other of the outer and inner members which serves as a stationary member, and positioned in face-to-face relation with the first sealing plate. The second sealing plate may have a side sealing lip fixed thereto and slidingly engaged with a radial upright wall of the first sealing plate and at least one radial sealing lip fixed to the second sealing plate and slidingly engaged with a first cylindrical wall of the first sealing plate, whereas the first sealing plate defines the core metal in the magnetic encoder with the multi-pole magnet element provided on the radial upright wall in overlapping relation at least in part therewith.

The first sealing plate referred to above is preferably of a generally inverted Z-shaped section having a first cylindrical wall on a mounting side that is mounted on the rotatable member, a radial upright wall and a second cylindrical wall. Also, the first sealing plate may be of a generally L-sectioned configuration.

Where the wheel bearing assembly is so constructed as hereinabove described, since one of the component parts of the sealing unit is defined by the magnetic encoder, the rotation of the wheel can be detected with a further compact structure with no need to increase the number of component parts. Also, where the magnetic encoder is incorporated in the sealing unit in the manner described above, although a problem may arise that in view of the magnetic encoder exposed to the above discussed road environment the sand particles may be trapped in between the magnetic encoder and the magnetic sensor, this problem can be substantially eliminated by the fact that since the surface hardness of the multi-pole magnet element is high as hereinbefore discussed, an effect of reducing possible frictional damages can be obtained. Yet, in the case of this structure described above, in view of the fact that the side and radial sealing lips fixed to the second sealing plate slidingly engage the first sealing plate, an excellent sealing effect can be obtained.

Where the first sealing plate is made of a generally inverted Z-shaped configuration as hereinbefore described, any one of the following structures can advantageously be employed.

For example, the radial upright wall of the first sealing plate may be of an axially stepped shape having an inner peripheral side portion and an outer peripheral side portion offset axially relative to each other.

The multi-pole magnet element may be fixedly crimped by the second cylindrical wall of the first sealing plate.

The second cylindrical wall of the first sealing plate may be formed with a plurality of plastically deformed portions that are plastically deformed at circumferentially spaced locations so as to protrude and, in such case, the multi-pole magnet element may be fixed to the first sealing plate by means of the plastically deformed portions. The plastically deformed portions may be formed by, for example, staking.

The second cylindrical wall of the first sealing plate may be formed with a plurality of tongues at circumferentially spaced locations so that the multi-pole magnet element can be fixed to the first sealing plate by means of plastic deformation of the tongues.

In the wheel bearing assembly according to the present invention, at least one of the multi-pole magnet element of the magnetic encoder and the core metal may preferably be treated with a rust preventive treatment. This rust preventive treatment can be performed by forming a rust preventive coating of a high anti-corrosion clear paint.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
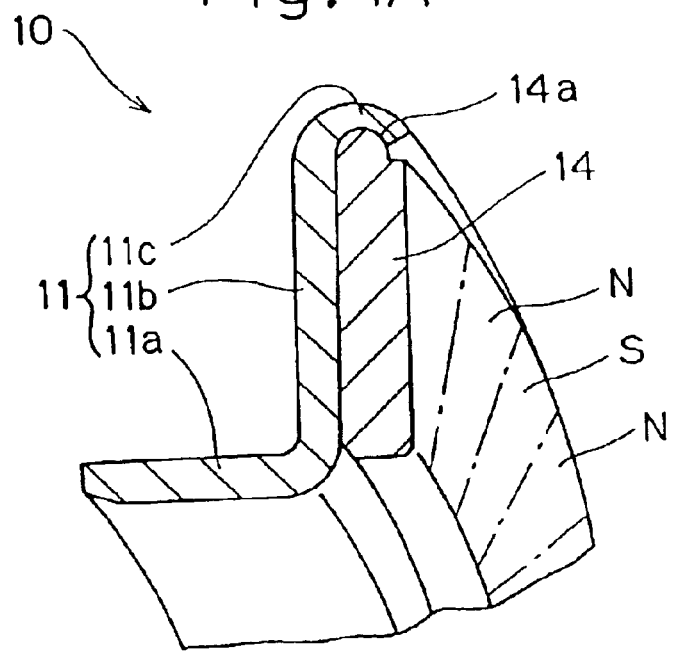
FIG. 1A is a fragmentary perspective view of a magnetic encoder according to a first preferred embodiment of the present invention.
Figure 1B:
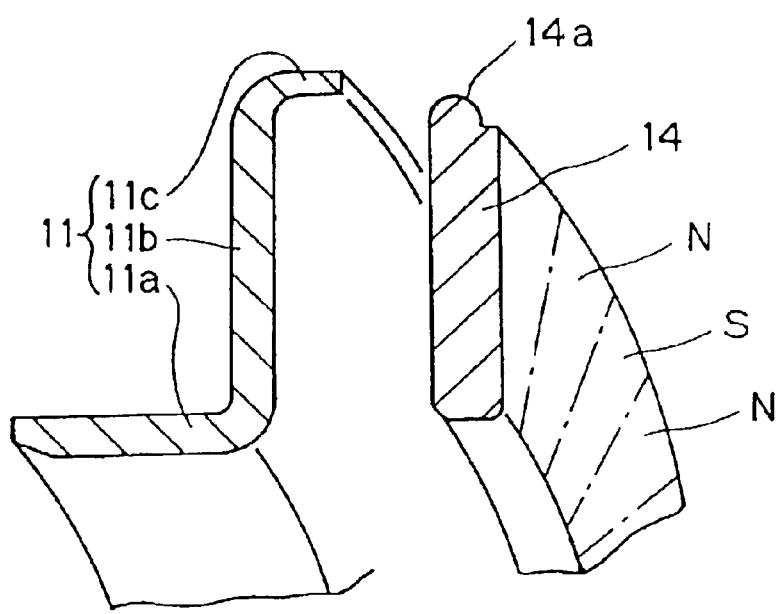
FIG. 1B is a fragmentary perspective view of the magnetic encoder of FIG. 1A, showing a multi-pole annular magnet element separated from a core metal.
Figure 2:
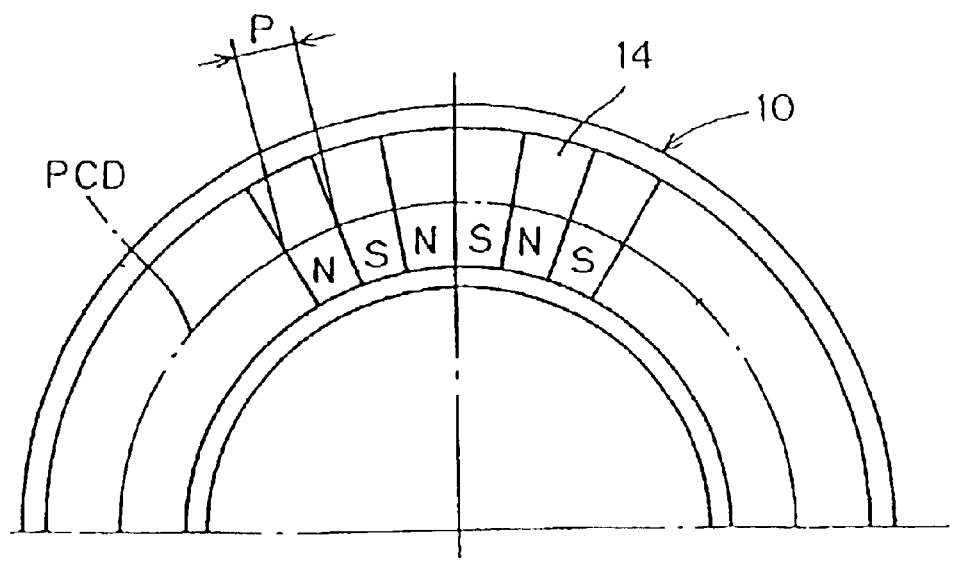
FIG. 2 is a fragmentary front elevational view, on an enlarged scale, showing the multi-pole annular magnet element of the magnetic encoder.
Figure 3:
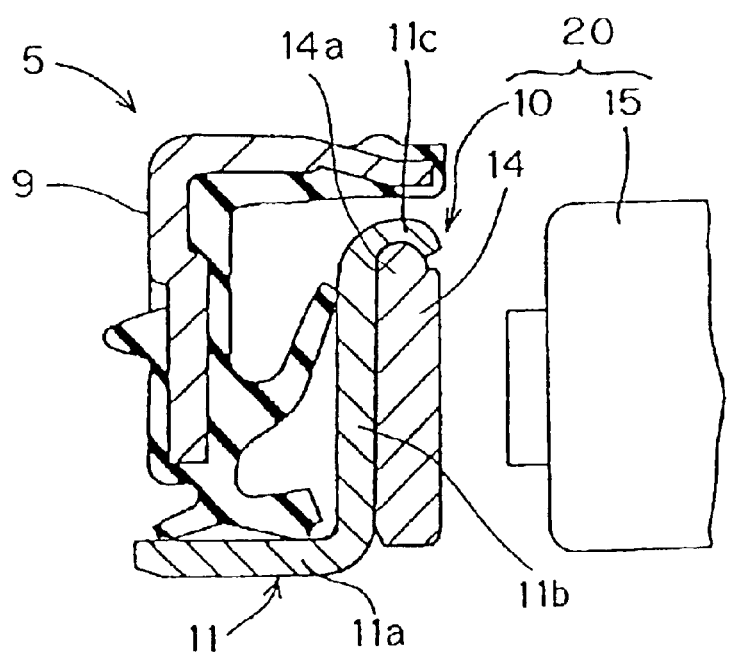
FIG. 3 is a fragmentary longitudinal sectional view of the magnetic encoder, showing a sealing unit and a magnetic sensor used in association therewith.

Referring to FIGS. 1 to 3 pertaining to a first preferred embodiment of the present invention, a magnetic encoder 10 shown therein includes an annular core metal 11 of a generally L-shaped section having a generally cylindrical axial wall 11a and a radial upright wall 11b substantially perpendicular to the axial wall 11a, and an annular multi-pole magnet element 14 secured to one of opposite annular surfaces of the radial upright wall 11b that faces towards a magnetic sensor 15. The multi-pole magnet element 14 has a plurality of opposite magnetic poles N and S defined therein so as to alternate with each other in a direction circumferentially thereof as best shown in FIG. 2, and is made up of a magnetic disc. The opposite magnetic poles S and N in the multi-pole magnet element 14 alternate with each other in the circumferential direction at intervals of a predetermined pitch p along the pitch circle diameter PCD shown in FIG. 2.

The magnetic encoder 10 of the structure described above is mounted on a rotary element (not shown), rotatable relative to a stationary element, with the multi-pole magnet element 14 facing the magnetic sensor 15 as shown in FIG. 3 so that the magnetic sensor 15 can detect the rotational speed of such rotary element. This magnetic encoder 10 cooperates with the magnetic sensor 15 to thereby define a rotation detecting device 20. It is to be noted that in FIG. 3 the magnetic encoder 10 is used as one of component parts of a sealing unit 5 employed in a bearing assembly (not shown) and is mounted on, for example, a rotatable bearing ring of the bearing assembly. The sealing unit 5 is made up of the magnetic encoder 10 and a sealing element 9 fixed on the stationary element. The details of the sealing unit 5 will be discussed in detail later.

As will be described in detail later, the multi-pole magnet element 14 is prepared from a mixture of a powdery magnetic material and a powdery non-magnetic material. The powdery magnetic material may be a powder of isotropic or anisotropic powdery ferrite such as that of a barium or strontium type. The powdery ferrite material may be in the form of granular particulates or in the form of pulverized particles of a wet-type anisotropic ferrite core. Where the pulverized particles of the wet-type anisotropic ferrite core are employed for the powdery magnetic material for the multi-pole magnet element 14, it is necessary for a mixture of the powdery magnetic material and the powdery non-magnetic material to form an anisotropic green material in a magnetic field as will be discussed later.

The powdery magnetic material used in the multi-pole magnet element 14 may be a magnetic material of a rare earth type. For example, the rare earth magnetic material may include, for example, a magnetic powder of samarium iron (SmFeN) or a magnetic powder of neodymium iron (NdFeB). Also, the powdery magnetic material referred to above may be a gas atomized powder of manganese aluminum (MnAl).

Also, the powdery magnetic material referred to above may be a mixture of two or more of the magnetic powder of samarium iron (SmFeN), the magnetic powder of neodymium iron (NdFeB) and the gas atomized powder of manganese aluminum. For example, the powdery magnetic material referred to above may be a mixture of the magnetic powder of samarium iron (SmFeN) and the magnetic powder of neodymium iron (NdFeB), or a mixture of the gas atomized powder of manganese aluminum and the magnetic powder of samarium iron, or a mixture of the magnetic powder of samarium iron, the magnetic powder of neodymium iron and the gas atomized powder of manganese aluminum.

Yet, for example, where the sole use of ferrite for the powdery magnetic material referred to above does not result in a sufficient quantity of a magnetic force developed by the multi-pole magnet element 14, the ferrite powder may be mixed with a required amount of one or more of the magnetic powder of neodymium iron (NdFeB) and the magnetic powder of samarium iron (SmFeN), both of which are a rare earth magnetic material, in which case the multi-pole magnet element 14 having an increased magnetic force can be prepared inexpensively.

The powdery non-magnetic metallic material contained in the multi-pole magnet element 14 may be one or a mixture of a powder of tin, copper, aluminum, nickel, zinc, tungsten, manganese and non-magnetic stainless steel, or an alloyed powder of two or more of them.

The powdery magnetic and non-magnetic metallic materials used in the multi-pole magnet element 14 have an average particle size within the range of 10 to 150 $\mu$m and preferably within the range of 20 to 130 $\mu$m. If the average particle size of any one of the powdery magnetic and non-magnetic metallic materials is smaller than 10 $\mu$m, an attempt to form a green compact by compacting the mixture of the powdery magnetic and non-magnetic metallic materials within a mold assembly at normal temperature would not be successful in that no green compact of a predetermined or required shape cannot be molded because the mixture of the powdery magnetic and non-magnetic metallic materials do not flow satisfactorily within the mold assembly. On the other hand, if the average particle size of any one of the powdery magnetic and non-magnetic metallic materials is greater than 150 $\mu$m, an attempt to form a green compact by compacting the mixture of the powdery magnetic and non-magnetic metallic materials within a mold assembly at normal temperature would not be successful in that no green compact cannot be separated from the mold assembly and cannot thus be molded because a sufficient strength of the green compact cannot be obtained.

Accordingly, the powdery magnetic and non-magnetic metallic materials of the average particle size falling within the predetermined range discussed above are mixed together in a predetermined mixing ratio by the use of any known powder mixer to provide the powdery mixture which is subsequently compacted within the mold assembly at normal temperatures to thereby provide the green compact.

With respect to the powdery mixture of the powdery magnetic and non-magnetic metallic materials for the multi-pole magnet element 14, the amount of the powdery non-magnetic metallic material used, which is not a magnetic powder, is within the range of 1 to 90 vol. %, preferably within the range of 5 to 85 vol. %, and more preferably within the range of 10 to 80 vol. %, based on the total volume of the powdery mixture.

If the content of the powdery non-magnetic metallic material, which is not a magnetic powder, is smaller than 1 vol. %, it means that the amount of the powdery non-magnetic metallic material acting as a metallic binder is insufficient and, therefore, the multi-pole magnet element 14 that is eventually obtained after a sintering process as will be described later, will be rigid, but fragile. For this reason, when a sintered element eventually forming the resultant multi-pole magnet element 14 is to be mechanically fixed to the core metal 11 by means of, for example, a clamping process or a press fitting process, the sintered element is susceptible to breakage. Also, since the metallic binder is short of a required amount, it may occur that no green compact cannot be formed.

On the other hand, if the content of the powdery non-magnetic metallic material is greater than 90 vol. %, the amount of the magnetic component used in the powdery mixture is so small relative to the amount of the powdery magnetic material that after the sintering process the resultant multi-pole magnet element 14 will exhibit an insufficient strength of magnetization and will not therefore provide a sufficient magnetic force desired or required in the magnetic encoder 10 for stabilized sensing.

The multi-pole magnet element 14 obtained after having been sintered has a coefficient of linear expansion within the range of $0.5 \times 10^{-5}$ to $9.0 \times 10^{-5}$, preferably within the range of $0.8 \times 10^{-5}$ to $7 \times 10^{-5}$, and more preferably within the range of $0.9 \times 10^{-5}$ to $5 \times 10^{-5}$.

The coefficient of linear expansion of a metallic material for the core metal 11 is $1.0 \times 10^{-5}$ in the case of, for example, a stainless steel (SUS 430 according to the JIS Standard).

Accordingly, if the coefficient of linear expansion of the multi-pole magnet element 14 is greater than $0.5 \times 10^{-5}$ or smaller than $9 \times 10^{-5}$, the difference between it and the coefficient of linear expansion of the metallic material for the core metal 11 is so large that when the magnetic encoder 10 is used under high or low temperature environment, the difference between the amount of change in dimension of the core metal 11 and that in dimension of the multi-pole magnet element 14 will become large and, therefore, the multi-pole magnet element 14 and the core metal 11 will interfere with each other to such an extent as to result in breakage of the multi-pole magnet element 14. In addition, the multi-pole magnet element 14 will hardly be interlocked with the core metal 11.

When the green compact (the green material) is to be formed, a lubricant such as, for example, zinc stearate may be added in the powdery mixture of the powdery magnetic and non-magnetic metallic materials during the mixing so that the compactibility or moldability of the green compact can be improved.

The green compact is of a porous structure having a porosity within the range of 5 to 30 vol. %, preferably within the range of 12 to 22 vol. % and more preferably within the range of 14 to 19 vol. %, relative to the volume of such green compact. If the porosity of the green compact is lower than 5 vol. %, there is a high possibility that the green compact being prepared may break by the effect of a spring back phenomenon that will be induced as a result of an elastic restoration from an elastically deformed state of powdery mixture when the compacting or molding pressure applied is progressively removed. On the other hand, if the porosity thereof is higher than 30 vol. %, the physical strength of the sintered element will be so low that the sintered element will break when it is to be mechanically fixed to the core metal 11 by means of a clamping process or a press fitting process as will be discussed in detail later. Also, the excessive porosity will result in an insufficient bonding among particulates and, therefore, it may occur that no green compact can be compacted.

Considering that the powdery magnetic material as well as the powdery non-magnetic metallic material is expensive, the wall thickness is preferred to be small. In terms of compactibility and handling capacity, the wall thickness preferably within the range of 0.5 to 5 mm and more preferably within the range of 0.6 to 3 mm is recommended. If the wall thickness is smaller than the lower limit of 0.3 mm, filling into the mold assembly will be difficult to achieve and no green molded element can hardly be obtained. Also, it is not desirable since the resultant green molded element will break during handling thereof.

On the other hand, if the wall thickness of the green molded element is greater than 10 mm, disadvantages will occur in terms of cost although the compactibility and the handling capacity can be improved. Also, if the wall thickness is too great, problems will arise that variation in density of the green molded element will be apt to occur and deformation will easily occur after the sintering process. In view of the foregoing, 0.3 to 5.0 mm is preferred for the wall thickness.

Figure 4:
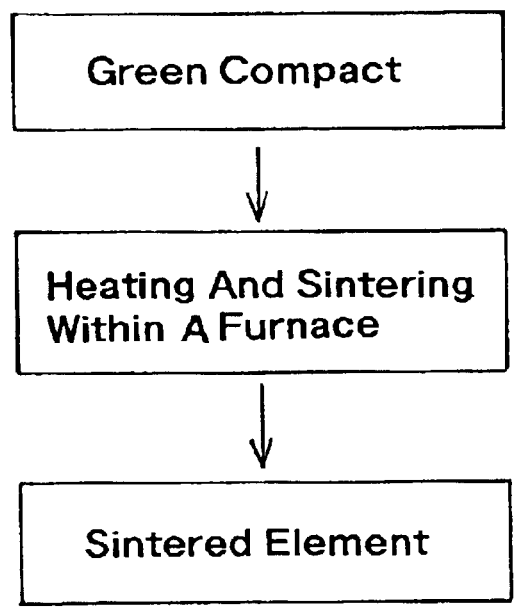
FIG. 4 is a flowchart showing a process of preparing a sintered element from a green material.

The resultant green molded element can be rendered to be a sintered element of a disc shape by heating and sintering within a furnace such as shown in FIG. 4. Heating and sintering within this furnace may be carried out by the use of an electric furnace under atmosphere, a vacuum furnace, a pusher furnace with inert gas introduced therein, or an inert furnace.

Figure 5:
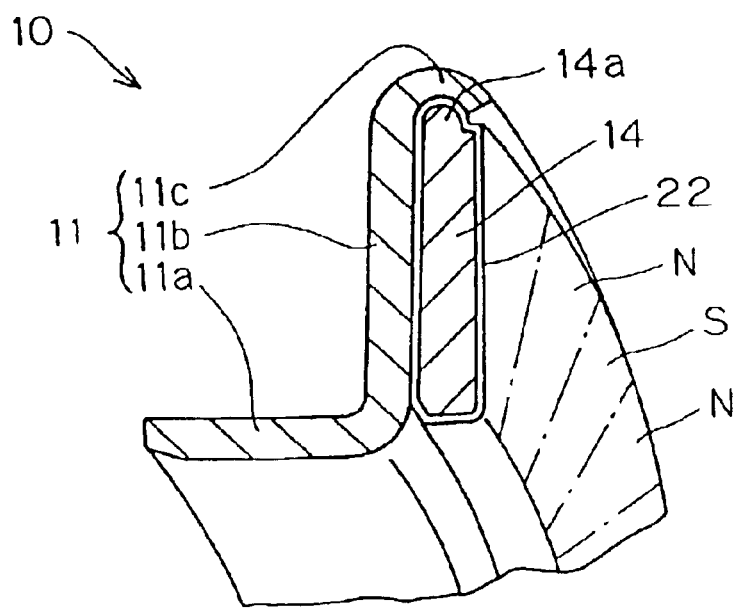
FIG. 5 is a fragmentary perspective view of that important portion of the magnetic encoder according to a second preferred embodiment of the present invention.

The sintered element eventually forming the magnetic encoder 10 may have a rust preventive coating 22 as shown in FIG. 5 for prevention of rusting thereof. The rust preventive coating 22 is, in other words, a anti-corrosion coating. For this rust preventive coating 22, a clear paint of high corrosion proofing material can be employed. This corrosion proofing paint can be expected to serve as a bonding agent for bonding the core metal 11 and the sintered element and can penetrate into pores in a surface region of the porous sintered element to such an extent that by the effect of an anchoring of the clear paint component the corrosion proofing paint can be retained well on the surface of the porous sintered element and, accordingly, even after the use for a prolonged period of time, it can exhibit a favorable bondability as the rust preventive coating.

The high corrosion proofing clear paint may include a clear paint of a modified epoxy resin, a clear paint of a modified epoxy phenol hardening type, a clear paint of an epoxy melamine system, a clear paint of an acrylic system and so on. Of them, the clear paint of the modified epoxy phenol hardening system and that of the epoxy melamine system can be suitably employed.

The sintered element which has been fat or cleaned may be coated with the clear paint by means of any suitable method such as vacuum impregnation, dipping, spraying or electrostatic painting and be subsequently wind-dried naturally or forcibly to remove a solvent component used in the clear paint and deposited on the sintered element to thereby leave a clear paint layer which is then baked under predetermined baking conditions (temperature and time) to deposit on the sintered element. By so doing, the rust preventive coating 22 can be formed on the surface of the multi-pole magnet element 14 as shown in FIG. 5. The rust preventive coating 22 may be formed on the surface of the magnetic encoder 10. Where the resultant magnetic encoder 10 is fitted to a vehicle wheel bearing assembly, the rust (corrosion) preventive coating so formed in the manner described above may have any suitable film thickness that may not be limited to any particular value, provided that it can satisfy the corrosion resistance required for the wheel bearing assembly. However, the film thickness of the rust preventive coating is preferably of a value equal to or greater than 0.5 µm.

When the magnetic encoder 10 according to the present invention is used in association with the wheel bearing assembly, any possible ingress of, for example, sand particles into a gap between the magnetic sensor 15 and the magnetic encoder 10 will result in damage to a surface of the magnetic encoder 10. Accordingly, if the film thickness of the rust preventive coating is smaller than 0.5 µm, such damage will extend to the sintered element which is a base material and, in the worst case, rusting that starts therefrom will no longer be prevented.

A metallic material that can be used to form the core metal 11 is a magnetic material, preferably a ferromagnetic material and, for example, a steel plate having a magnetic property and a rust preventive property can be suitably employed therefor. Examples of such steel plate include a stainless steel plate of a ferrite system (SUS 430 or the like according to the JIS Standard), a rolled steel plate treated to have a rust resistant property and so on.

The core metal 11 is of any suitable annular configuration and preferably has a shape capable of permitting the multi-pole magnet element 14 to be fixed thereto. In particular, the core metal 11 preferably has such a shape that the multi-pole magnet element 14 can be mechanically fixed thereto by means of crimping or caulking.

Where the multi-pole magnet element 14 is fixed in position by the use of a crimping technique, the core metal 11 is of an annular configuration of a generally inverted Z-shaped cross section including the cylindrical axial wall 11a on a radially inward side serving as a mounting side and the radial upright wall 11b extending radially outwardly from one end of the axial wall 11a and a curled outer peripheral portion 11c structurally integral with the radial upright wall 11b as hereinbefore described and as shown in FIG. 1B.

This can readily be formed of a metallic plate such as a steel plate or the like by the use of any known press work. The radial upright wall 11b is of an annular flat shape and the sintered element having not yet been magnetized and eventually forming the multi-pole magnet element 14 is held flat against one of the opposite surfaces of the radial upright wall 11b facing in a direction counter to the axial wall 11a, with an outer peripheral portion of the sintered element crimped by the curled outer peripheral portion 11c of the radial upright wall 11b. By so doing, the multi-pole magnet element 14 can be firmly held against that surface of the radial upright wall 11b of the core metal 11 with its outer peripheral portion firmly crimped by the curled outer peripheral portion 11c of the radial upright wall 11b as clearly shown in FIG. 1A. It is to be noted that the curled outer peripheral portion 11c of the radial upright wall 11b may be either continuous over the entire circumference thereof to define a single crimped area, or discrete or discontinuous over the entire circumference thereof to define a plurality of crimped areas. Also, the crimped area extends over the entire length of the core metal 11 in a circumferential direction thereof, to thereby define an annular configuration. It is also to be noted that an outer peripheral edge of the multi-pole magnet element 14 that accommodates the curled outer peripheral portion 11c of the radial upright wall 11b is inwardly depressed as at 14a over the entire circumference thereof so that a circumferential free edge of the curled outer peripheral portion 11c, when the latter is crimped, can be accommodated within the circumferentially extending depression 14a without protruding axially outwardly from a level flush with the remaining annular surface of the multi-pole magnet element 14 that confronts the magnetic sensor 15. The circumferentially extending depression 14a referred to above is somewhat set backward from that level flush with that remaining annular surface of the multi-pole magnet element 14 confronting the magnetic sensor 15. An outer peripheral portion of the annular surface of the multi-pole magnet element 14 opposite to that annular surface thereof where the circumferentially extending depression 14a is defined is so shaped as to have a generally arcuately curved surface region and, on the other hand, that outer peripheral portion 11c of the radial upright wall 11b is curled so as to follow the curvature of the arcuately curved surface region of the outer peripheral portion of that annular surface of the multi-pole magnet element 14 to thereby define the crimped area. Fixing by crimping may be done over the entire circumferential of the multi-pole magnet element 14 as shown in sectional representation in FIG. 5.

Figure 6:
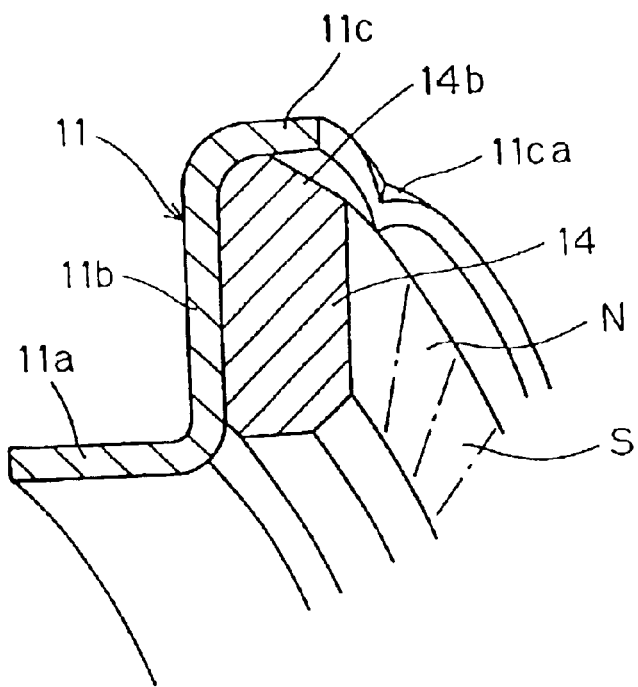
FIG. 6 is a fragmentary sectional view of the magnetic encoder according to a third preferred embodiment of the present invention.
Figure 7:
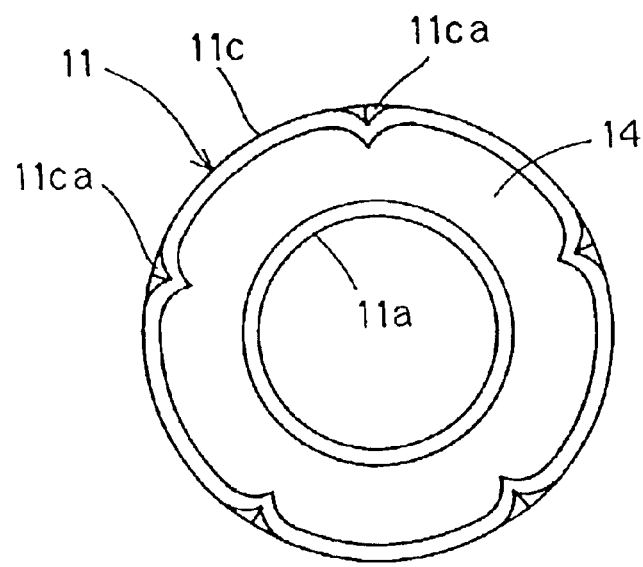
FIG. 7 is a front elevational view of the magnetic encoder of FIG. 6, showing the details of the annular multi-pole magnet element used therein.

Also, fixing by crimping may be carried out in a manner as shown in sectional and front elevational views in FIGS. 6 and 7, respectively. In this example shown therein, the core metal 11 is, as is the case with that employed in the example shown in FIG. 1, of a generally inverted Z-shaped, annular configuration including the cylindrical axial wall 11a on the radially inner side, the radial upright wall 11b extending radially outwardly from that end of the axial wall 11a and the curled outer peripheral portion 11c continued from the radial upright wall 11b. However, the curled outer peripheral portion 11c of the metal core 11 shown in FIGS. 6 and 7 has a plurality of plastically deformed segments 11ca that are plastically deformed by means of, for example, staking so as to protrude radially inwardly therefrom, so that the multi-pole magnet element 14 can be fixedly retained by the radial upright wall 11b of the core metal 11c by means of those plastically deformed segments 11ca. Even in this example shown in FIGS. 6 and 7, the outer peripheral portion of the annular surface of the multi-pole magnet element 14 that is retained by the respective plastically deformed segments 11ca is depressed inwardly as at 14b inwardly from the remaining annular surface of the multi-pole magnet element 14 facing towards the magnetic sensor 15 so that the plastically deformed segments 11ca will not protrude axially outwardly from the level flush with the remaining annular surface of the multi-pole magnet element 14 that confronts the magnetic sensor 15. The circumferential depression 14b in that outer peripheral portion of the annular surface of the multi-pole magnet element 14 is defined by an annular surface area that is inclined radially outwardly from the remaining annular surface of the multi-pole magnet element 14 confronting the magnetic sensor 15 towards the opposite annular surface thereof.

Figure 8:
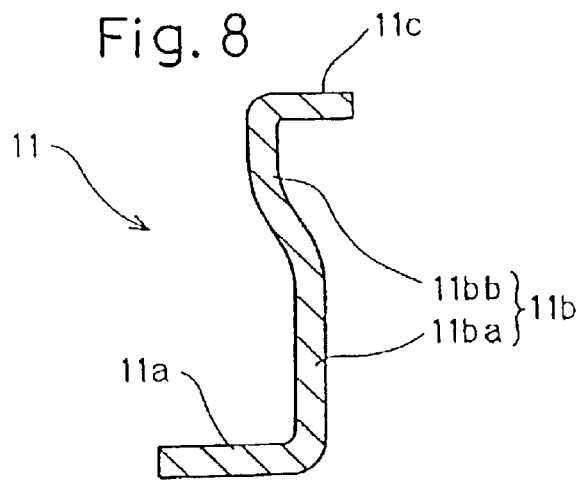
FIG. 8 is a transverse sectional view, on an enlarged scale, showing a modified form of the core metal used in the magnetic encoder of FIG. 6.

In any one of the examples shown respectively in FIGS. 1 and 6, the core metal 11 may be of a shape wherein the radial upright wall 11b has a radially inner wall portion 11ba and a radially outer wall portion 11bb that are displacedly stepped relative to each other in an axial direction as shown in FIG. 8. Referring now to FIG. 8, although not shown, the multi-pole magnet element 14 is arranged on one of opposite surfaces of a cylindrical portion 11c of the radial upright wall 11b in a manner similar to that in the example of FIG. 1.

Figure 9A:
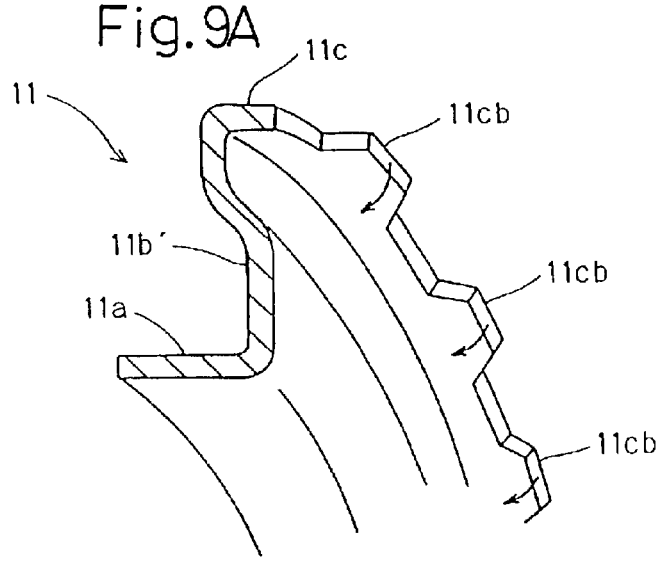
FIG. 9A is a fragmentary perspective view of a further modified form of the core metal.
Figure 9B:
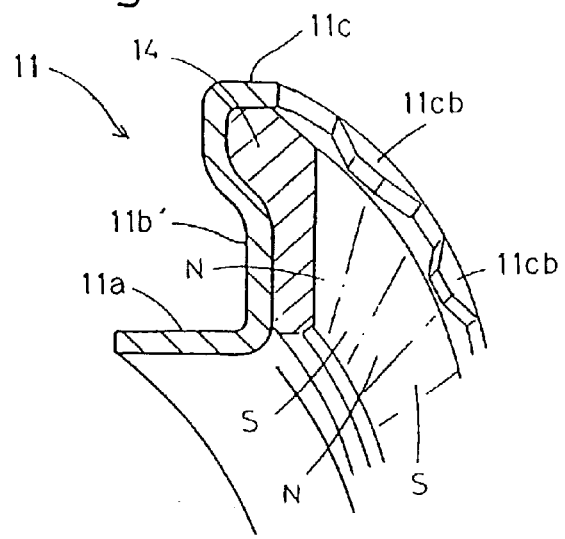
FIG. 9B is a fragmentary perspective view of the magnetic encoder, using the further modified core metal of FIG. 9A used therein.
Figure 10:
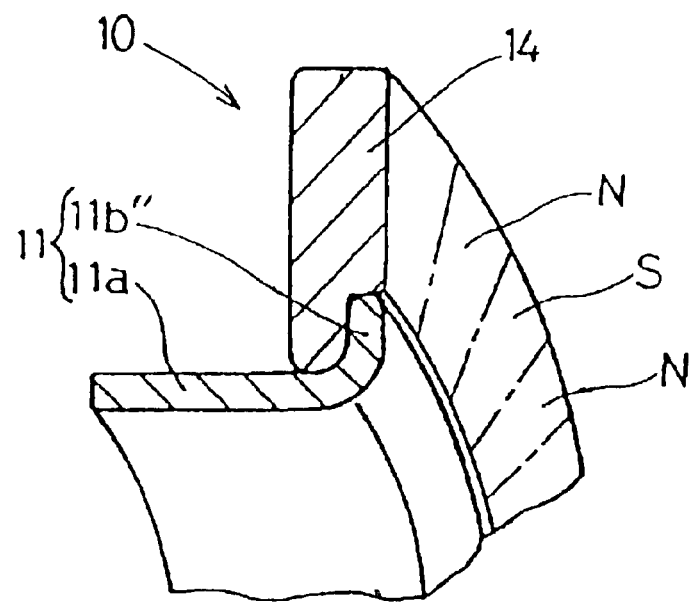
FIG. 10 is a fragmentary perspective view of the magnetic encoder according to a fourth preferred embodiment of the present invention.

Also, as shown in FIG. 9, in the core metal 11 shaped to represent a generally inverted Z-shaped section as is the case with that employed in any one of the foregoing examples, a circumferentially extending free edge of the cylindrical portion 11c may be formed with a plurality of tongues 11cb spaced a distance from each other in a direction circumferentially thereof, which tongues 11cb may be plastically deformed, that is, crimped radially inwardly as shown by the arrows to allow the core metal 11 to firmly retain the multi-pole magnet element 14 in position. The multi-pole magnet element 14 is arranged on one of opposite surfaces of a cylindrical portion 11c of the radial upright wall 11b in a manner similar to that in the example of FIG. 1. Even in this example, as is the case with the example shown in FIG. 8, the radial upright wall 11b is stepped. Where the radial upright wall 11b is stepped as shown in FIG. 8, the annular surface of the multi-pole magnet element 14 that faces towards the core metal 11 may be so shaped as to follow the shape of the corresponding surface of the radial upright wall 11b as shown in FIG. 9B.

Where fixing by press fit is employed, for example, as shown in FIG. 10, the core metal 11 may be of a generally L-sectioned annular configuration including a cylindrical axial wall 11a on the radial inner side and a radial upright wall 11b" extending radially outwardly from one end of the cylindrical axial wall 11a. The cylindrical axial wall 11a and the radial upright wall 11b are formed from a metallic plate such as, for example, a steel plate by the use of any known press work and are therefore integral with each other. The radial upright wall 11b" is formed flat, and a disc-shaped sintered element that eventually defines the multi-pole magnet element 14 is press-fitted and, hence, fixed in position around the outer periphery of the cylindrical axial wall 11a until the multi-pole magnet element 14 is brought into abutment with the flat radial upright wall 11b". The radial upright wall 11b" extends radially outwardly from the cylindrical axial wall 11a a distance sufficient to allow it to be engaged with an inner peripheral portion of the multi-pole magnet element 14.

Figure 11:
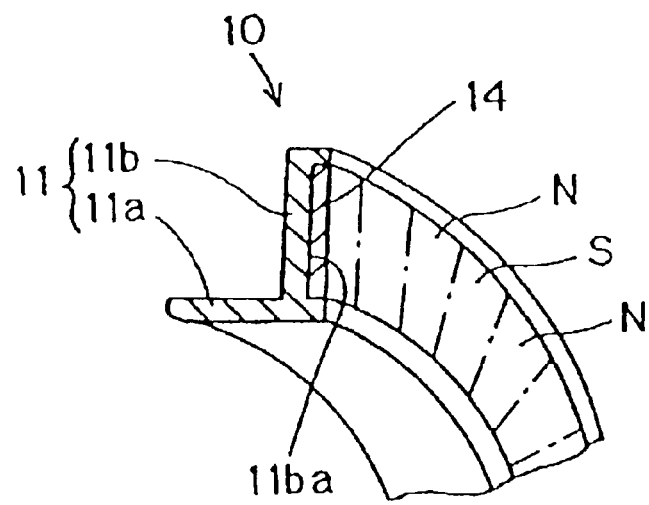
FIG. 11 is a fragmentary perspective view of the magnetic encoder according to a fifth preferred embodiment of the present invention.

Although in any one of the foregoing examples, the core metal 11 has been described as prepared from a steel plate by the use of any known press work, the core metal may be prepared by grinding a steel material or the like as shown in FIG. 11. In the example shown in FIG. 11, the core metal 11 has the radial upright wall 11b formed with an annular groove 11ba by means of any known cutting technique.

A mixed magnetic powder sintered magnet disc provided circumferentially on the core metal 11 that is a metallic annular member as hereinbefore discussed will become a multi-pole magnet element 14 when magnetized circumferentially to form a plurality of magnetic poles, and this multi-pole magnet element 14 and the core metal 11 altogether constitute the magnetic encoder 10. In such case, the mixed magnetic powder sintered magnet disc (the sintered element) containing the powdery magnetic material together with the powdery non-magnetic metallic material used as a binder can be rendered to be a dry blend of powders by dispersing the powdery mixture by the use of a powder mixer while the mixing ratio of the powdery non-magnetic metallic material and the powdery magnetic material is adjusted. For this reason, the percent based relative content (the volume based percent) of the powdery magnetic material contained in the sintered element can be increased. Accordingly, the magnetic force sufficient to allow the magnetic sensor 15 shown in FIG. 3 to stably detect such magnetic force can be easily obtained and there is no need to increase the thickness of the multi-pole magnet element 14.

The magnetic encoder 10 of the construction as hereinbefore fully discussed is used for detecting the rotational speed with the multi-pole magnet element 14 held in face-to-face relation with the magnetic sensor 15 as hereinbefore described in connection with FIG. 3. When the magnetic encoder 10 is rotated, the magnetic sensor 15 detects alternate passages of the magnetic poles N and S that are magnetized in a number of poles on the multi-pole magnet element 14, so that the number of revolution of the multi-pole magnet element 14 can be detected in the form of a train of pulses. The pitch p between the neighboring magnetic poles N and S as shown in FIG. 2 can be set to a small value and, for example, the accuracy of the pitch p of 1.5 mm with the single pitch deviation being ±3% can be secured, thereby allowing the rotational speed to be highly accurately detected. This single pitch deviation referred to above represents the difference in distance between the neighboring magnetic poles detected at a position spaced a predetermined distance from the magnetic encoder 10, which is expressed in terms of the proportion to a target pitch. In the case where the magnetic encoder 10 is applied to the sealing unit 5 of the bearing assembly, the rotation of one of component parts of the bearing assembly on which the magnetic encoder 10 is mounted can be thus detected.

Since the multi-pole magnet element 14 is made of the sintered element (mixed magnetic powder sintered magnet disc) containing the powdery magnetic material, the magnetic encoder 10 can be manufactured compact in structure with its wall thickness reduced while securing the sufficient magnetic force necessary to achieve a stabilized detection and, also, the magnetic encoder 10 thus obtained is excellent in abrasion resistance and in productivity.

In addition, the multi-pole magnet element 14 has a surface hardness higher than that of the conventional coder of a type utilizing an elastic material or an elastomer containing a powdery magnetic material or magnetic particles. For this reason, if it is applied in the rotation detecting device 20 for detection of the rotational speed of the wheel, even though sand particles or the like are trapped in the gap between the surface of the multi-pole magnet element 14, then being rotated, and the surface of the magnetic sensor 15, then held stationary, during the run of the motor vehicle, little frictional wear and/or damage will occur in the multi-pole magnet element 14. Thus, as compared with that utilizing the conventional elastic element, an effect of considerable reduction in frictional wear can be obtained.

The flatness of the surface of the mixed magnetic powder sintered magnet disc that defines the multi-pole magnet element 14 provided on the core metal 11, that is a metallic annular member, so as to extend circumferentially thereof may be not greater than 200 μm and preferably not greater than 100 μm. If the flatness of the disc surface is greater than 200 μm, the gap (air gap) between the magnetic sensor 15 and the disc surface will vary in size during rotation of the magnetic encoder 10, making the sensing accuracy worse.

For a similar reason, wobbling of the surface of the mixed magnetic powder sintered magnet disc which may take place during rotation of the magnetic encoder 10 is not greater than 200 μm and preferably not greater than 100 μm.

Figure 12:
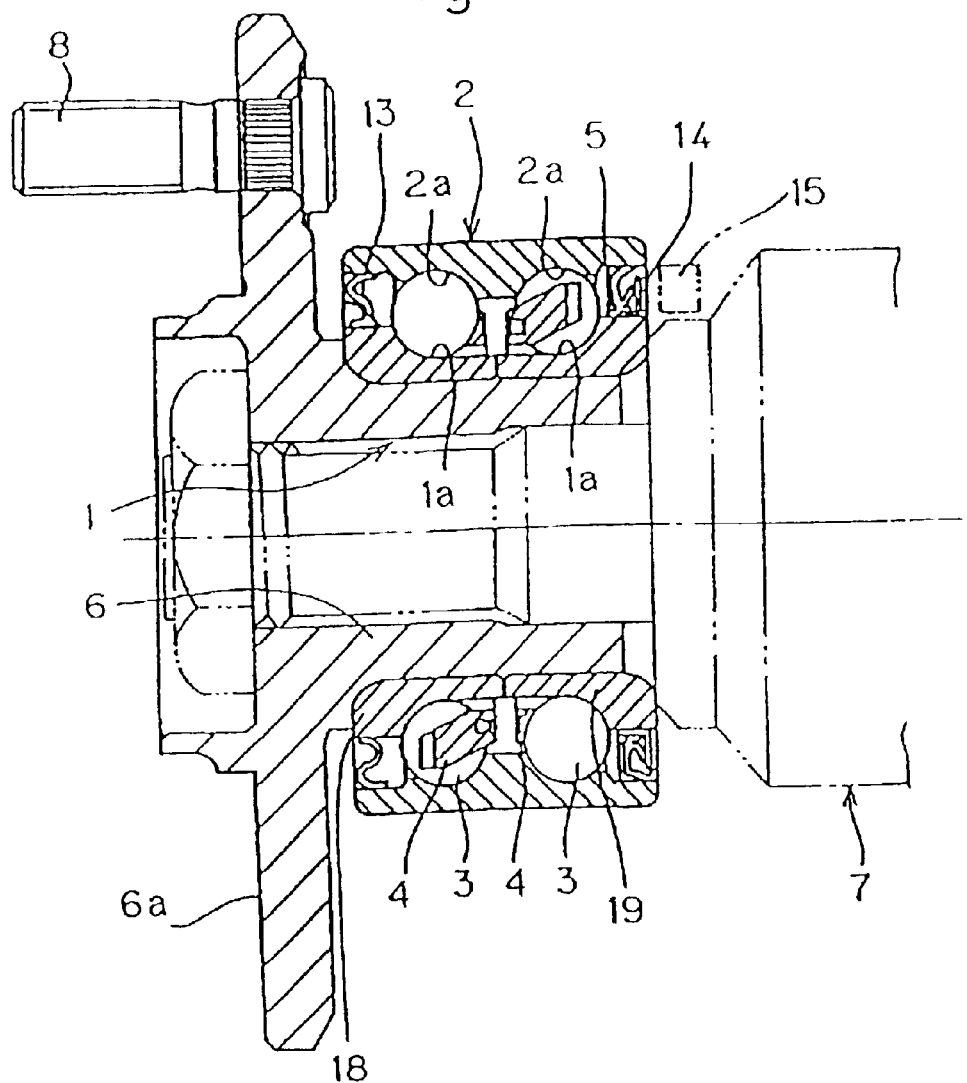
FIG. 12 is a longitudinal sectional view of a wheel bearing assembly utilizing the magnetic encoder according to the first embodiment of the present invention.

Hereinafter, an example of the wheel bearing assembly equipped with this magnetic encoder 10 and the sealing unit 5 used therein will be described in detail with particular reference to FIGS. 12 and 13. As best shown in FIG. 12, the wheel bearing assembly includes an inner member 1, an outer member 2 substantially enclosing the inner member 1 to define an annular working space therebetween, a plurality of, for example, two, rows of rolling elements 3 rollingly movably interposed between the inner and outer members 1 and 2, and axially spaced sealing units 5 and 13 for sealing opposite annular ends of the cylindrical space that is delimited between the inner and outer members 1 and 2. One of the sealing units, that is, the right sealing unit 5 as viewed in FIG. 12 is provided with the magnetic encoder 10.

The inner member 1 has an outer peripheral surface formed with axially spaced inner raceways 1a in the form of a radially inwardly recessed groove whereas the outer member 2 has an inner peripheral surface formed with similarly axially spaced outer raceways 2a in the form of a radially outwardly recessed groove, which raceways 2a are aligned with the inner raceways 1a in the inner member 1. The rows of the rolling elements 3 are accommodated in part within the inner raceways 1a and in part within the outer raceways 2a so that the inner and outer members 1 and 2 can rotate relative to each other. In practice, the inner and outer members 1 and 2 are members positioned on radially inwardly and radially outwardly sides, respectively. Those inner and outer members 1 and 2 may be an bearing inner race and a bearing outer race, respectively, or may be a combination of the bearing inner or outer race with any other component. In addition, the inner member 1 may be an axle or shaft. The rolling elements 3 may be either balls or rollers, although balls are employed for the rolling elements 3 in the illustrated embodiment.

The wheel bearing assembly of the structure discussed above may be a double row rolling bearing, more particularly a double row angular contact ball bearing and the bearing inner race of such bearing assembly is of a structure comprised of inner race segments 18 and 19 having the respective inner raceways 1a defined therein. The inner race segments 18 and 19 are mounted externally on a hollow shank of a hub wheel 6 so as to define the inner member 1 in cooperation with the hub wheel 6. It is to be noted that instead of the inner member 1 of the three-component design comprised of the hub wheel 6 and the split inner race segments 18 and 19, the inner member 1 may be of a two-component design comprised of a single hub wheel having raceways defined therein and also having the hub wheel 6 and one of the inner race segments, that is, the inner race segment 18 integrated together, and the other inner race segment 19.

The hub wheel 6 is coupled at a right end thereof with one end (for example, an outer race) of a constant velocity universal joint 7 while a wheel (not shown) is drivingly coupled with a radially outwardly extending flange 6a of the hub wheel 6 by means of a plurality of bolts 8. The other end (for example, an inner race) of the constant velocity universal joint 7 is coupled with a drive shaft (not shown). The outer member 2 is comprised of a bearing outer race having a radially outwardly extending flange that is secured to a housing (not shown) including, for example, a knuckle employed in a suspension system. As a matter of design, the rolling elements 3 of each row are orderly retained by an associated retainer 4.

Figure 13:
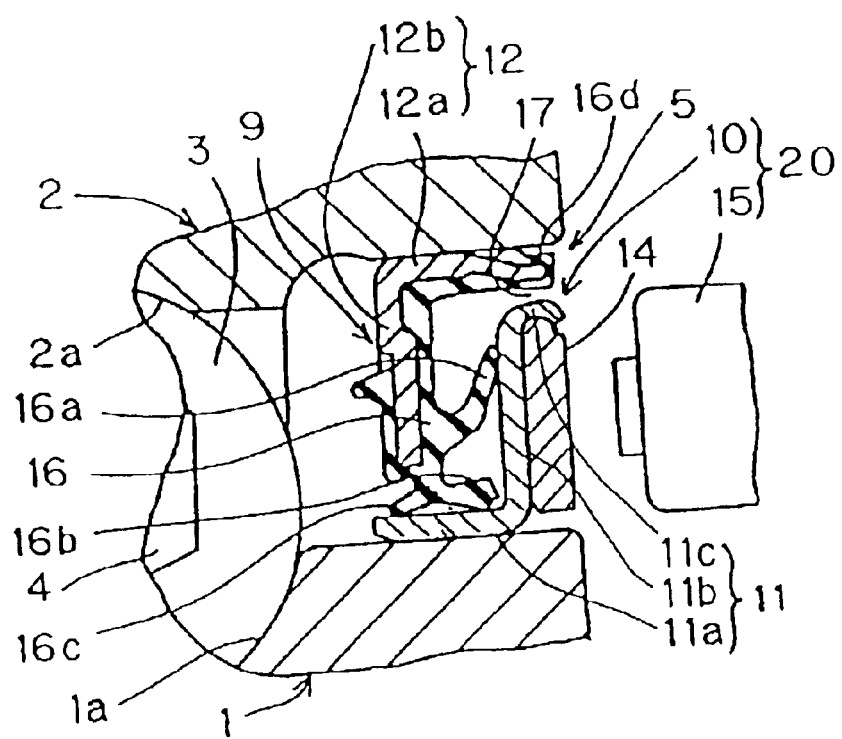
FIG. 13 is a longitudinal sectional view, on an enlarged scale, of a portion of the wheel bearing assembly of FIG. 12, showing how the magnetic encoder is used therein.

FIG. 13 illustrates, on an enlarged scale, the sealing unit 5 equipped with the magnetic encoder 10. The sealing unit 5 is similar to that shown in FIG. 3. Though a part of such sealing unit 5 has already been described hereinbefore, the details thereof will now be described. The sealing unit 5 is fitted to one of the inner and outer members 1 and 2 which serves as a rotatable element while the magnetic encoder 10 or the core metal 11 thereof serves as a slinger. In this illustrated example, the rotatable element is represented by the inner member 1 and, therefore, the magnetic encoder 10 is fitted to and carried by the inner member 1.

The sealing unit 5 includes first and second annular sealing plates 11 and 12 prepared from a metallic plate and secured to the inner and outer members 1 and 2, respectively. The first sealing plate 11 is defined by the core metal 11 of the magnetic encoder 10 and because of it, it should be understood that the both are interchangeable with each other. However, in the description that follows, reference will be made to the core metal 11 rather than the first sealing plate. The magnetic encoder 10 employed in the illustrated wheel bearing assembly is that shown in and described with reference to FIGS. 1 to 3 and, accordingly, the details thereof will not be reiterated for the sake of brevity. It is, however, to be noted that when the magnetic sensor 15 is positioned so as to confront the multi-pole magnet element 14 of the magnetic encoder 10 as shown in FIG. 12, the combination of the magnetic encoder 10 with the magnetic sensor 15 constitutes the rotation detecting device 20 for detecting the rotational speed of the vehicle wheel (not shown).

The second sealing plate 12 is a member constituting the sealing member 9 shown in FIG. 3 and is of a generally L-sectioned configuration including a cylindrical axial wall 12a, press-fitted onto the inner peripheral surface of the outer member 2, and a radial upright wall 12b extending radially inwardly from one end of the cylindrical axial wall 12a towards the inner member 1. This second sealing plate 12 is integrally provided with a side sealing lip 16a, adapted to slidingly engage the radial upright wall 11b of the first sealing plate on the core metal 11, and first and second radial sealing lips 16b and 16c slidingly engaging the cylindrical axial wall 11a of the first sealing plate 11. These sealing lips 16a to 16c are respective parts of an elastic member 16 that is bonded by vulcanization to the second sealing plate 12. While the number of those sealing lips 16a to 16c may not be always limited to three as shown and may be chosen to be any desired value, the arrangement shown in FIG. 13 makes use of the single side sealing lip 16a and the two radial sealing lips 16b and 16c extending axially outwardly and inwardly, respectively.

The second sealing plate 12 firmly clamps a portion of the elastic member 16 at a region where the second sealing plate 12 is interconnected with the outer member 2 that is a stationary member. Specifically, the elastic member 16 is of a design having an end cover 16d formed integrally therewith so as to extend from an inner peripheral surface of the cylindrical axial wall 12a towards an outer peripheral surface of the same cylindrical axial wall 12a after having been turned around an axial free end of the cylindrical axial wall 12a, with the end cover 16d interposed and clamped between the second sealing plate 12 and the outer member 2.

The cylindrical axial wall 12a of the second sealing plate 12 is spaced a slight distance axially from the cylindrical axial wall 11c of the core metal 11, that is, the first sealing plate to define a gap that serves as a labyrinth seal 17.

With the wheel bearing assembly so constructed as hereinabove described, rotation of the inner member 1 rotatable together with the vehicle wheel can be detected by the magnetic sensor 15 through the magnetic encoder 10 secured to the inner member 1, wherefore the rotational speed of the vehicle wheel can be detected.

In this wheel bearing assembly, since the magnetic encoder 10 is used as one of the component parts of the sealing unit 5, the wheel rotation can be detected with no need to increase the number of component parts thereof. In general, the wheel bearing assembly is used under an environment full of, for example, sand particles on a road surface and, therefore, it often occurs that particulate matter such as sand particles is caught in the gap between the magnetic encoder 10 and the magnetic sensor 15 facing such magnetic encoder 10. However, according to the present invention, since the multi-pole magnet element 14 of the magnetic encoder 10 is made of the sintered element and is therefore hard as hereinbefore described, an undesirable damage such as frictional wear of the surface of the multi-pole magnet element 14 can be advantageously reduced considerably as compared with the conventional one utilizing an elastic member. Also, while the space at that bearing end of the wheel bearing assembly 5 may be a limited narrow space because of the presence of the constant velocity universal joint 7 and a bearing support member (not shown) in the vicinity thereof, the rotation detecting device 20 can easily be installed since the multi-pole magnet element 14 of the magnetic encoder 10 can be manufactured to have a reduced wall thickness as hereinbefore discussed.

Sealing of and between the inner and outer members 1 and 2 can be attained by sliding contact of the sealing lips 16a to 16c provided on the second sealing plate 12 and the labyrinth seal 17 defined by the slight gap between the cylindrical axial wall 11c of the core metal 11, that is, the first sealing plate and the cylindrical axial wall 12a of the second sealing plate 12.

It is to be noted that in the wheel bearing assembly shown in FIGS. 12 and 13, the core metal 11 of the magnetic encoder 10 is of the shape shown in and described with reference to FIG. 1. However, any of the magnetic encoders 10 shown respectively in FIGS. 6 to 11 can be equally employed.

Particularly where the magnetic encoder 10 is used as one of the component parts of the sealing unit 5 of the bearing assembly, the multi-pole magnet element 14 may be disposed so as to oriented inwardly with respect to the bearing assembly in a manner substantially reverse to that in any of the previously described embodiments. In other words, the multi-pole magnet element 14 may be mounted on one of the opposite surfaces of the core metal 11 that confronts axially inwardly of the bearing assembly. In such case, it is preferred that the core metal 11 is made of a non-magnetic material.

Figure 14:
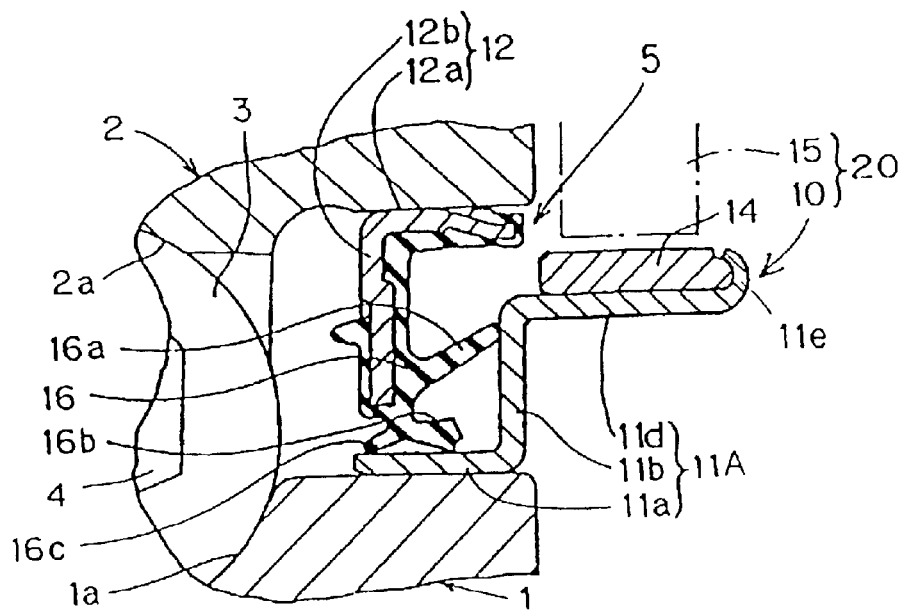
FIG. 14 is a longitudinal sectional view similar to FIG. 13, showing that portion of the magnetic encoder for the wheel bearing assembly according to a sixth preferred embodiment of the present invention.

Also, the magnetic encoder 10 may not be limited to the type in which as is the case with any one of the previously described embodiments the multi-pole magnet element 14 is oriented axially, but it may be of a type in which the multi-pole magnet element 14 is oriented radially as shown in FIG. 14. Specifically, in the example shown in FIG. 14, the core metal 11A that is a sealing plate that serves as a slinger of the sealing unit 5 includes a second cylindrical wall 11d extending axially outwardly from the radial upright wall 11b, and the multi-pole magnet element 14 is fixedly mounted on this second cylindrical wall 11d. In other words, the second cylindrical wall 11d has a free end formed integrally with a crimping plate portion 11e that extends radially outwardly therefrom, which portion 11e is curled inwardly to crimp an adjacent end of the multi-pole magnet element 14 to thereby secure the latter to an outer peripheral surface of the second cylindrical wall 14. The core metal 11A in this example shown in FIG. 14 is of a generally inverted Z-shaped section sequentially depicted by the cylindrical wall 11a, the radial upright wall 11b and the second cylindrical wall 11d is integrally formed with the crimping plate portion 11e continued from the axial end of the second cylindrical wall 11d so as to extend radially outwardly. The magnetic sensor 15 is positioned radially outwardly of and spaced a distance from the multi-pole magnet element 14.

Figure 15:
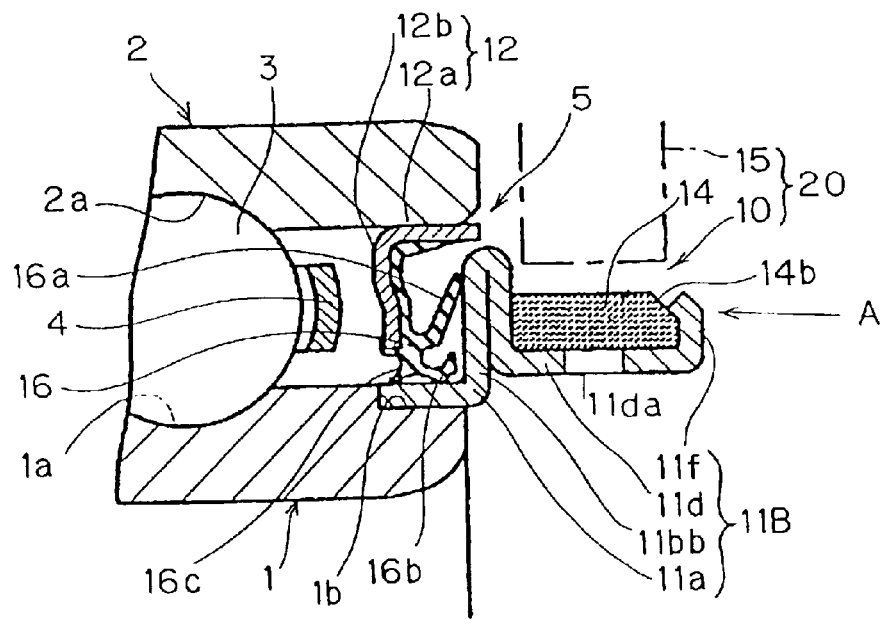
FIG. 15 is a fragmentary longitudinal sectional view of the wheel bearing assembly, showing the magnetic encoder for the wheel bearing assembly according to a seventh preferred embodiment of the present invention.
Figure 16:
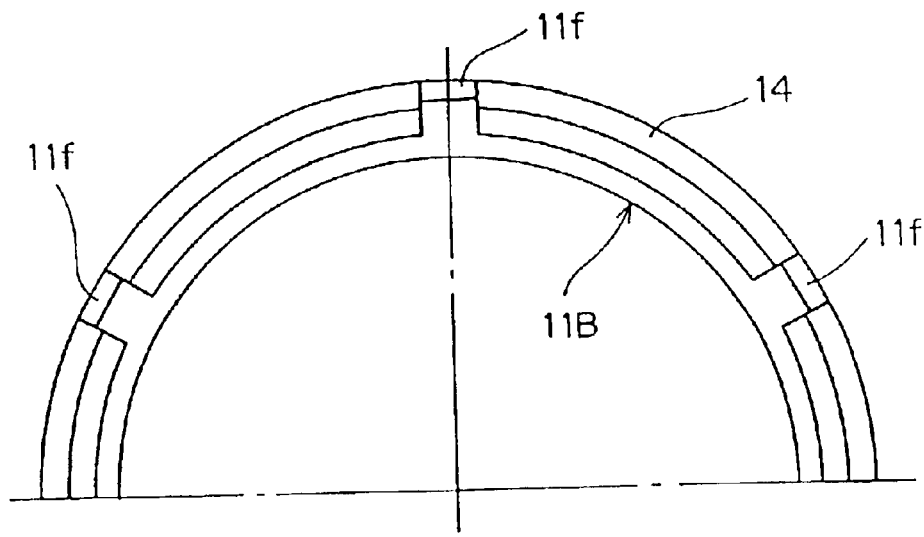
FIG. 16 is a front elevational view, on an enlarged scale, of the magnetic encoder of FIG. 15.

Another embodiment in which the multi-pole magnet element 14 of the magnetic encoder 10 is oriented radially is shown in FIG. 15. FIG. 16 illustrates the magnetic encoder 10 of FIG. 15 as viewed in a direction along the arrow A shown in FIG. 15. In this embodiment, the core metal 11B that is a first sealing plate that serves as a slinger of the sealing unit 5 includes the cylindrical axial wall 11a mounted on the outer peripheral surface of the inner member 1, a radial double upright wall 11bb formed by bending a wall segment, extending radially outwardly from one end of the cylindrical axial wall 11a, so as to be turned backwardly to extend radially inwardly, and the second cylindrical wall 11d extending axially outwardly from a free end of the radial double upright wall 11bb. A free end of the second cylindrical wall 11d opposite to the radial double upright wall 11bb is formed with a plurality of circumferentially spaced tongues 11f. The multi-pole magnet element 14 is mounted on an outer peripheral surface of the second cylindrical wall 11d with the tongues 11f crimped inwardly to firmly secure the multi-pole magnet element 14 in position on the second cylindrical wall 11d.

Also, in the embodiment shown in FIGS. 15 and 16, a portion of the outer peripheral surface of the inner member 1 adjacent the outer end thereof is formed with a radial inward depression 1b on to which the cylindrical axial wall 11a of the core metal 11B is mounted. Accordingly, with one end of the cylindrical axial wall 11a held in abutment with an annular shoulder defining the radial inward depression 1b in the inner member 1, the magnetic encoder 10 is axially positioned. The second cylindrical wall 11d of the core metal 11B has a depleted portion 11da defined therein, the size of which depleted portion 11da is such that positioning of the multi-pole magnet element 14 on the second cylindrical wall 11d will not be disturbed, thereby reducing the weight of the magnetic encoder 10 as a whole. The depleted portion 11da may be in the form of a plurality of circumferentially spaced openings defined in the second cylindrical wall 11d of the core metal 11B. An annular surface area of the multi-pole magnet element 14 that is held in contact with the tongues 11f when the latter are crimped to fix the multi-pole magnet element 14 in position on the second cylindrical wall 11d is formed with a corresponding number of recesses 14b each having an inclined surface in a manner similar to those shown in FIG. 6. Other structural features of the magnetic encoder 10 his embodiment shown in FIGS. 15 and 16 are similar to those shown in and described with reference to FIGS. 12 and 13.

Figure 17:
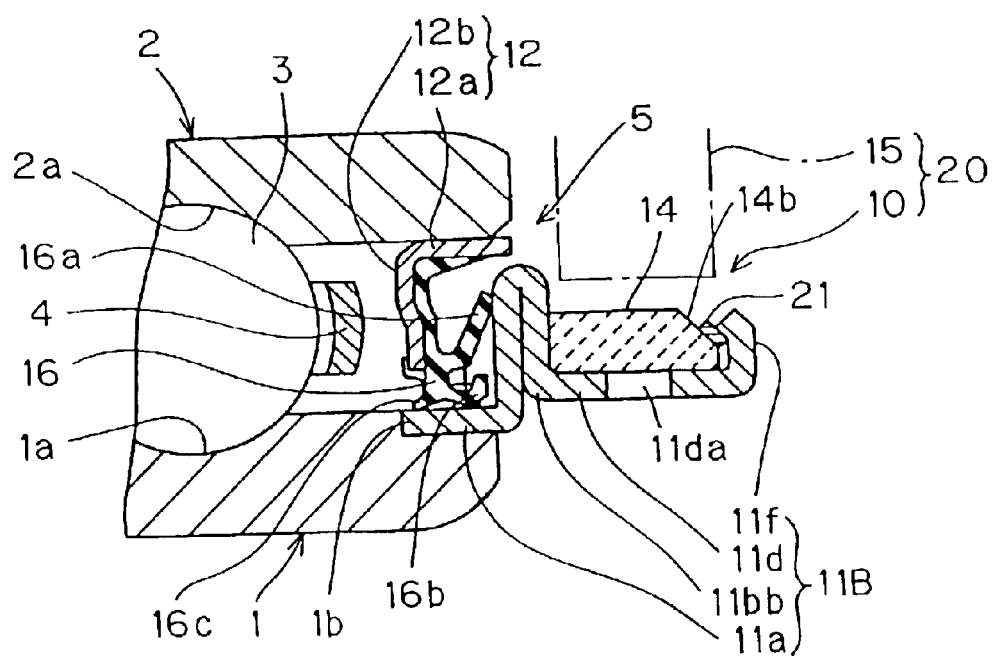
FIG. 17 is a fragmentary longitudinal sectional view of the wheel bearing assembly, showing the magnetic encoder for the wheel bearing assembly according to an eighth preferred embodiment of the present invention.

FIG. 17 illustrates a further embodiment in which the multi-pole magnet element 14 of the magnetic encoder 10 is oriented radially. In this embodiment shown in FIG. 17, the core metal 11B is similar to that employed in the embodiment shown in FIG. 15, but differs therefrom in that in the embodiment of FIG. 17, a cushioning member 21 is interposed between each of the tongues 11f and the multi-pole magnet element 14. The cushioning member 21 employed is made of a rubber material or a synthetic resin and is, for example, of a ring shape. Other structural features of the magnetic encoder in this embodiment shown in FIG. 17 are similar to those shown in and described with reference to FIG. 15.

Although the magnetic encoder 10 according to any one of the foregoing embodiments has been described as forming a part of the sealing unit 5 of the bearing assembly, it is, however, to be noted that the magnetic encoder 10 according to any one of the foregoing embodiments may not be limited to the one which forms a part of the sealing unit 5, but may be employed alone in its integrity for the detection of rotation. By way of example, the magnetic encoder 10 according to the embodiment shown in and described with reference to FIG. 1 may be used on the bearing assembly separate from and independent of the sealing unit 5.

Figure 18:
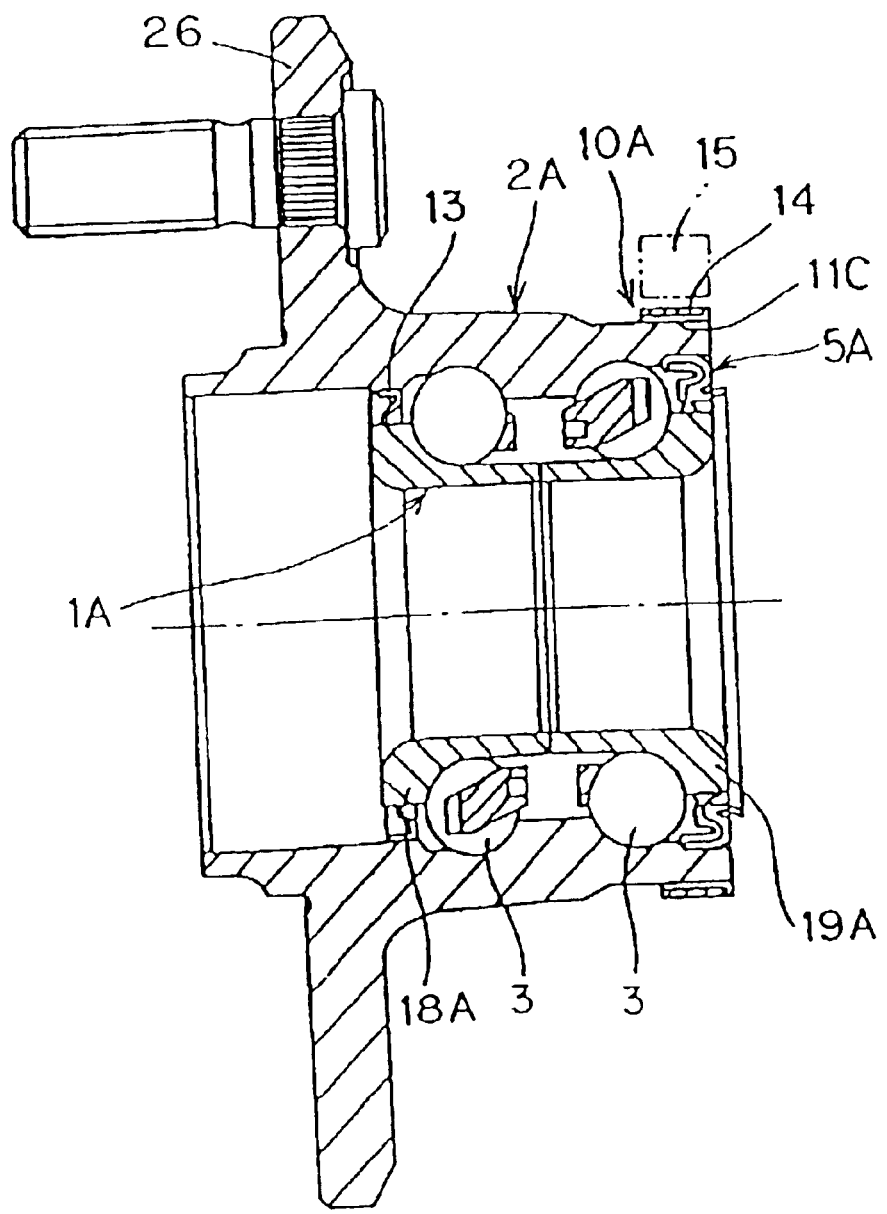
FIG. 18 is a longitudinal sectional view of the wheel bearing assembly, showing the magnetic encoder used therein according to a ninth preferred embodiment of the present invention.

Also, as shown in FIG. 18, the magnetic encoder 10A may be so designed that in order to orient the multi-pole magnet element 14 in a direction radially thereof, the multi-pole magnet element 14 is mounted on the outer peripheral surface of the core metal 11C of a cylindrical configuration. In such case, the magnetic encoder 10 may be mounted under interference on the outer peripheral surface of the outer member 2A of the wheel bearing assembly. The wheel bearing assembly shown therein is of a type wherein of the inner and outer members 1A and 2A, the outer member 2A is used as a rotatable member and a wheel support flange 26 is provided on the outer member 2A. The sealing unit 5A is provided on the bearing assembly separate from and independent of the magnetic encoder 10A. The outer member 2A is comprised of a pair of split inner race segments 18A and 19A.

Furthermore, the magnetic encoder according to the present invention may employ one of the following structures (1) to (8) for fixing the multi-pole magnet element to the core metal.

(1) The core metal is of a design wherein a press fitting portion capable of being mounted under interference on the rotatable member (for example, a rotary race of a rolling bearing assembly) and a portion for mounting the multi-pole magnet element are separated from each other. (For example, the embodiment shown in FIG. 1).

(2) In the structure (1) described above, fixing of the multi-pole magnet element to the core metal is carried out by a crimped portion in which the core metal is crimped. In such case, the multi-magnet element is overlapped on a portion of the core metal and one radial end of the multi-pole magnet element in section is carried out by crimping the core metal. (For example, each of the embodiments shown in FIGS. 1 and 8.)

(3) In the structure (2) described above, the crimping portion of the core metal is separated in a plurality of locations in a direction circumferentially thereof (For example, the embodiment shown in FIG. 16.)

(4) In the structure (2) described above, that portion of the multi-pole magnet element that is crimped by the crimping portion of the core metal is recessed inwardly from one of the opposite surfaces of the multi-pole magnet element confronting the magnetic sensor, with no protrusion extending outwardly beyond the one of the opposite surface of the multi-pole magnet element. The recess referred to above may be, for example a surface area inclined or stepped relative to that one of the opposite surfaces of the multi-pole magnet element. (For example, each of the embodiments shown respectively in FIGS. 1 and 16.)

(5) In the structure (2) described above, the surface of the core metal that is held in contact with the multi-pole magnet element is formed with the depleted portion. (For example, the embodiment shown in FIG. 17.)

(6) In the structure (2) described above, the crimping portion of the core metal is an arcuate or annular portion extending in the circumferential direction. (For example, each of the embodiments shown respectively in FIGS. 1 and 15.)

(7) In the structure (2) described above, an abutment portion with which one of opposite radial ends of the multi-pole element remote from that portion of the multi-pole magnet element that is crimped by the crimping portion of the core metal is brought in abutment is provided on the core metal. This abutment portion concurrently serves as a positioning means for positioning the core metal axially relative to the rotatable member (for example, the rotatable race of the rolling bearing assembly). (For example, the embodiment of FIG. 15. A combination of the radial double upright wall 11bb and the cylindrical wall 11a defines the abutment portion referred to above.)

(8) In the structure (2) described above, a cushioning member is inserted in between a surface portion of the core metal that is retained by the crimping portion and the crimping portion. (For example, the embodiment shown in FIG. 17.)

The magnetic encoder according to the present invention can accommodate any one of the multi-pole magnet mounting structures having respective novel features discussed under the structures (1) to (8) and, for this reason, it has a relatively large range of application and provides a high reliability and is therefore extremely excellent.

In the magnetic encoder of the present invention in which the multi-pole magnet element having the opposite magnetic poles alternating in a direction circumferentially thereof and the core metal for supporting this multi-pole magnet element are employed, the multi-pole magnet element is made of the sintered element formed by sintering a powdery mixture of the powdery magnetic material and the powdery non-magnetic metallic material. Accordingly, while securing the magnetic force sufficient to be sensed stably, the magnetic encoder can be thin walled and can be assembled compact while exhibiting a resistance to frictional wear. Also, even in the manufacture of the multi-pole magnet element which defines a coder portion, a sintering and molding method of the powdery mixture by means of a dry blending of powders does not requires a vulcanizing step as compared with an injection molding method or a compressive molding method in the case of the conventional elastomer or elastic material and, in addition, the molding load is minimal and, accordingly, the process for the production of the magnetic encoder can be extremely simplified.

Also, mounting of the multi-pole magnet element on to the core metal can be carried out by means of a mechanical fixing method such as, for example, the simple crimping process or the press-fitting process and, therefore, even when the magnetic encoder is exposed to severe environmental conditions such as high or low temperature, the reliability can be retained.

Since the wheel bearing assembly according to the present invention makes use of the magnetic encoder of the present invention, rotation detection can be achieved with a compact structure and the magnetic encoder for the rotation detection is robust. In particular, where one of the component parts of the sealing unit is defined by the magnetic encoder, the rotation of the wheel can be detected with no need to increase the number of component parts.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A magnetic encoder which comprises:
   a multi-pole magnet element having a plurality of opposite magnetic poles alternating with each other in a circumferential direction; and
   a core metal for supporting the multi-pole magnet element;
   said multi-pole magnet element being a sintered element prepared by sintering a powdery mixture of a powdery magnetic material and a powdery non-magnetic metallic material.

2. The magnetic encoder as claimed in claim 1, wherein the powdery magnetic material is a ferrite powder.

3. The magnetic encoder as claimed in claim 1, wherein the powdery magnetic material is a pulverized powder of a wet-type anisotropic ferrite core, and wherein the multi-pole magnet element is constituted by the sintered element formed by sintering a green compact that is prepared by magnetizing the powdery mixture of the powdery magnetic material and the powdery non-magnetic metallic material.

4. The magnetic encoder as claimed in claim 1, wherein the powdery magnetic material is a magnetic powder of a samarium type.

5. The magnetic encoder as claimed in claim 1, wherein the powdery magnetic material is a magnetic powder of a neodymium type.

6. The magnetic encoder as claimed in claim 1, wherein the powdery non-magnetic metallic material is a powder of stainless steel.

7. The magnetic encoder as claimed in claim 1, wherein the powdery non-magnetic metallic material is a powder of tin.

8. The magnetic encoder as claimed in claim 1, wherein the powdery mixture contains two or more powdery magnetic materials or two or more powdery non-magnetic metallic materials.

9. The magnetic encoder as claimed in claim 1, wherein the powdery magnetic material and the powdery non-magnetic metallic material both used in the powdery mixture have an average particle size not smaller than 10 μm and not greater than 150 μm.

10. The magnetic encoder as claimed in claim 1, wherein in a composition of the powdery mixture, the volume based content of the powdery non-magnetic metallic material is not smaller than 1 vol. % and not greater than 90 vol. %.

11. The magnetic encoder as claimed in claim 1, wherein the multi-pole magnet element made of the sintered element has a coefficient of linear expansion not lower than $0.5 \times 10^{-5}$ and not higher than $9.0 \times 10^{-5}$.

12. The magnetic encoder as claimed in claim 1, wherein a green compact of the powdery mixture before being sintered has a porosity of not lower than 5 vol. % and not higher than 30 vol. %.

13. The magnetic encoder as claimed in claim 1, wherein the sintered element has a plate thickness not smaller than 0.3 mm and not greater than 5 mm.

14. The magnetic encoder as claimed in claim 1, wherein a surface of the multi-pole magnet element made of the sintered element is formed with a rust preventive coating made of a anti-corrosion clear paint, said rust preventive coating having a film thickness not smaller than 0.5 μm and said high anti-corrosion clear paint is a paint of a modified epoxy phenol hardening system.

15. A wheel bearing assembly utilizing a magnetic encoder as claimed in claim 1.

16. The wheel bearing assembly as claimed in claim 15 for supporting a wheel for rotation relative to a vehicle body, which assembly comprises an outer member having an inner peripheral surface formed with a plurality of rows of first raceways, an inner member having a corresponding number of second raceways defined therein in alignment with the first raceways in the outer member, and rows of rolling elements rollingly received in part within the first raceways and in part within the second raceways, said wheel bearing assembly comprises:

a sealing unit for sealing an annular space delimited between the outer member and the inner member, said sealing unit including a first sealing plate mounted on one of the outer and inner members which serves as a rotatable member, and a second sealing plate of a generally L-sectioned configuration mounted on the other of the outer and inner members which serves as a stationary member, and positioned in face-to-face relation with the first sealing plate;

said first sealing plate being of a generally inverted Z-shaped section having a first cylindrical wall on a mounting side that is mounted on the rotatable member, a radial upright wall and a second cylindrical wall;

said second sealing plate having a side sealing lip slidingly engaged with the radial upright wall of the first sealing plate and at least one radial sealing lip slidingly engaged with the first cylindrical wall;

said first sealing plate defining a core metal in the magnetic encoder with the multi-pole magnet element provided on the radial upright wall in overlapping relation therewith.

17. The wheel bearing assembly as claimed in claim 16, wherein the radial upright wall of the first sealing plate is of an axially stepped shape having an inner peripheral side portion and an outer peripheral side portion offset axially relative to each other.

18. The wheel bearing assembly as claimed in claim 16, wherein the multi-pole magnet element is fixedly crimped by the second cylindrical wall of the first sealing plate.

19. The wheel bearing assembly as claimed in claim 16, wherein the second cylindrical wall of the first sealing plate is formed with a plurality of plastically deformed portions that are plastically deformed at circumferentially spaced locations so as to protrude, the multi-pole magnet element being fixed to the first sealing plate by means of the plastically deformed portions.

20. The wheel bearing assembly as claimed in claim 16, wherein the second cylindrical wall of the first sealing plate is formed with a plurality of tongues at circumferentially spaced locations, the multi-pole magnet element being fixed to the first sealing plate by means of plastic deformation of the tongues.

21. The wheel bearing assembly as claimed in claim 15 for supporting a wheel for rotation relative to a vehicle body, which assembly comprises an outer member having an inner peripheral surface formed with a plurality of rows of first raceways, an inner member having a corresponding number of second raceways defined therein in alignment with the first raceways in the outer member, and rows of rolling elements rollingly received in part within the first raceways and in pair within the second raceways, said wheel bearing assembly comprising:

a sealing unit for sealing an annular space delimited between the outer member and the inner member, said sealing unit including a first sealing plate of a generally L-sectioned configuration mounted on one of the outer and inner members which serves as a rotatable member, and a second sealing plate of a generally L-sectioned configuration mounted on the other of the outer and inner members which serves as a stationary member, and positioned in face-to-face relation with the first sealing plate;

said second sealing plate having a side sealing lip slidingly engaged with a radial upright wall of the first sealing plate and at least one radial sealing lip slidingly engaged with a cylindrical wall of the first sealing plate;

said first sealing plate defining a core metal in the magnetic encoder with the multi-pole magnet element provided on the radial upright wall in overlapping relation at least in part therewith.

22. The wheel bearing assembly as claimed in claim 15, wherein at least one of the multi-pole magnet element of the magnetic encoder and the core metal is treated with a rust preventive treatment.

23. The wheel bearing assembly as claimed in claim 22, wherein the rust preventive treatment is performed by forming a rust preventive coating of a high anti-corrosion clear paint.

* * * * *

UNITED STATES PATENT AND TRADEMARK OFFICE
CERTIFICATE OF CORRECTION

PATENT NO. : 6,789,948 B2 Page 1 of 1
APPLICATION NO. : 10/251800
DATED : September 14, 2004
INVENTOR(S) : Tatsuo Nakajima It is certified that error appears in the above-identified patent and that said Letters Patent is hereby corrected as shown below:

Column 26, line 30, (claim 21, line 9) change "pair" to --part--.

Signed and Sealed this

Twenty-sixth Day of February, 2008

JON W. DUDAS
*Director of the United States Patent and Trademark Office*